(12) United States Patent
Maeda et al.

(10) Patent No.: US 9,382,381 B2
(45) Date of Patent: Jul. 5, 2016

(54) AROMATIC POLYAMIDE AND FILM-FORMING COMPOSITION CONTAINING SAME

(71) Applicant: NISSAN CHEMICAL INDUSTRIES, LTD., Tokyo (JP)

(72) Inventors: Daisuke Maeda, Funabashi (JP); Kei Yasui, Funabashi (JP); Masaaki Ozawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 9 days.

(21) Appl. No.: 14/411,261

(22) PCT Filed: Jun. 27, 2013

(86) PCT No.: PCT/JP2013/067600
§ 371 (c)(1),
(2) Date: Dec. 24, 2014

(87) PCT Pub. No.: WO2014/003092
PCT Pub. Date: Jan. 3, 2014

(65) Prior Publication Data
US 2015/0252147 A1    Sep. 10, 2015

(30) Foreign Application Priority Data

Jun. 29, 2012  (JP) .................................. 2012-146973
Jan. 24, 2013  (JP) .................................. 2013-010788

(51) Int. Cl.
*C08G 69/42*  (2006.01)
*C08G 69/26*  (2006.01)
*C08L 77/06*  (2006.01)
*C08L 77/10*  (2006.01)
(Continued)

(52) U.S. Cl.
CPC ................ *C08G 69/26* (2013.01); *C08G 69/32* (2013.01); *C08G 69/48* (2013.01); *C08J 5/18* (2013.01); *C08L 77/06* (2013.01); *C08L 77/10* (2013.01); *C09D 177/10* (2013.01); *C08G 18/603* (2013.01); *C08J 2377/06* (2013.01)

(58) Field of Classification Search
CPC .......... C08L 77/00; C08L 77/06; C08L 77/10
See application file for complete search history.

(56) References Cited

U.S. PATENT DOCUMENTS

2008/0185332 A1*  8/2008  Niu et al. ................. 210/500.38
2012/0193284 A1*  8/2012  Koo et al. ................. 210/500.21
2013/0112619 A1*  5/2013  Livingston et al. ........... 210/644

FOREIGN PATENT DOCUMENTS

JP      61-275327 A    12/1986
JP      2005/23106 A    1/2005
(Continued)

OTHER PUBLICATIONS

International Search Report for PCT/JP2013/067600 mailed on Sep. 24, 2013.
(Continued)

*Primary Examiner* — Gregory Listvoyb
(74) *Attorney, Agent, or Firm* — Birch, Stewart, Kolasch & Birch, LLP

(57) ABSTRACT

An aromatic polyamide, which is obtained by reacting a benzene tricarboxylic acid or a derivative thereof with a diamine compound in the presence of a terminally blocked compound having a crosslinkable group and a functional group that is reactive with a benzene tricarboxylic acid such as 1-amino-2-propanol or a derivative thereof as expressed by scheme (1), and which has a weight average molecular weight of 1,000-100,000 in terms of polystyrene as determined by gel permeation chromatography, has good solubility in organic solvents, while maintaining heat resistance and transparency. A thick film can be formed using a film-forming composition that contains this aromatic polyamide.

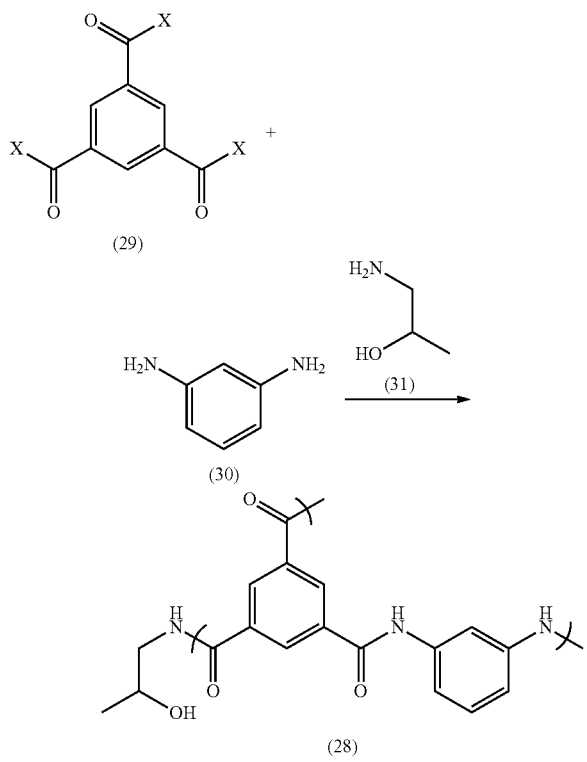

8 Claims, 7 Drawing Sheets

Figure 1:
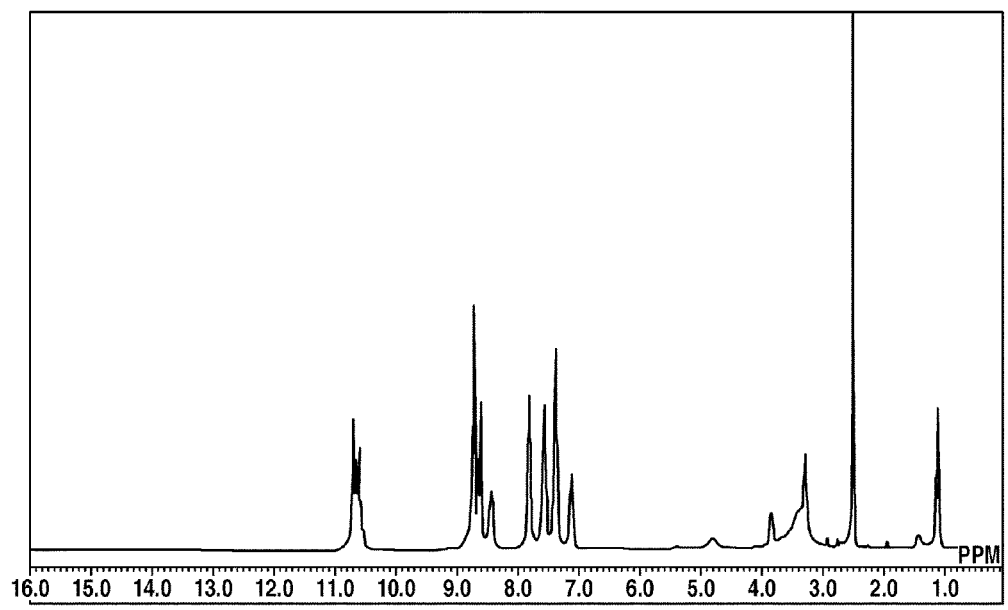

(51) Int. Cl.
*C08J 5/18* (2006.01)
*C08G 69/48* (2006.01)
*C09D 177/10* (2006.01)
*C08G 69/32* (2006.01)
*C08G 18/60* (2006.01)

(56) References Cited

FOREIGN PATENT DOCUMENTS

| JP | 2006-77185 A | 3/2006 |
| WO | WO 2009/145158 A1 | 12/2009 |
| WO | WO 2009/151012 A1 | 12/2009 |
| WO | WO 2012/010889 * | 1/2012 |
| WO | WO 2012/115216 A1 | 8/2012 |

OTHER PUBLICATIONS

Jikei et al., "Dendritic Aromatic Polyamides and Polyimides", Journal of Polymer Science: Part A: Polymer Chemistry, 2004, vol. 42, pp. 1293-1309.

Jikei et al., "Synthesis of Hyperbranched Aromatic Polyamide from Aromatic Diamines and Trimesic Acid", Macromolecules, 1999, vol. 32, pp. 2061-2064.

Written Opinion of the International Searching Authority for PCT/JP2013/067600 mailed on Sep. 24, 2013.

* cited by examiner

AROMATIC POLYAMIDE AND FILM-FORMING COMPOSITION CONTAINING SAME

TECHNICAL FIELD

The present invention relates to an aromatic polyamide and to a film-forming composition containing the same. More specifically, the invention relates to an aromatic polyamide having a hyperbranched structure, a high refractive index and a high solubility, and to a film-forming composition containing the same that is capable of thick-film formation.

BACKGROUND ART

Aromatic polyamides, because of their excellent properties such as heat resistance, transparency and mechanical properties, are widely used in such fields as textiles, molding materials, composite materials, and electrical and electronic components.

However, in general, aromatic polyamides, owing to intramolecular hydrogen bonding and stacking between the aromatic groups, have large cohesive forces between the molecules and thus a very low solubility in organic solvents. Another problem is that they become insoluble during reaction.

In linear aromatic polyamides, known methods for increasing the solubility include the technique of using a monomer into which flexible structural units such as oxygen, $SO_2$ and methylene groups have been introduced (Patent Document 1), and the technique of using a diamine having a group with a large molecular size, such as a fluorene group (Patent Document 2).

However, it is expected that hyperbranched polymers will generally exhibit a better solubility than linear polymers.

Two approaches are known for preparing such polymers: the $AB_2$ route and the $A_2+B_3$ route, "A" and "B" corresponding to functional groups within the monomers.

For example, in the $AB_2$ route, a trifunctional monomer having one functional group A and two functional groups B reacts to give a hyperbranched polymer.

In the $A_2+B_3$ route, a monomer having two functional groups A reacts with a monomer having three functional groups B to give a hyperbranched polymer. In this route, in an ideal case, 1:1 adducts of two monomers having only one functional group A and only two functional groups B form, and these adducts further react to give a hyperbranched polymer.

$AB_2$ type polycondensation of a monomer having a carboxylic acid group and an amino group on the molecule (Non-Patent Document 1) and $A_2+B_3$ type polycondensation using a benzenetricarboxylic acid and a diamine compound (Non-Patent Document 2) have been reported for such hyperbranched polyamides.

However, in these methods, the loss of solubility is difficult to control and the reactions take a long time.

Moreover, the hyperbranched aromatic polyamide obtained by a technique like that in Non-Patent Document 2 is inadequately soluble in organic solvents.

PRIOR ART DOCUMENTS

Patent Documents

Patent Document 1: JP-A 2005-23106
Patent Document 2: JP-A 2006-77185

Non-Patent Documents

Non-Patent Document 1: J. *Polym. Sci. Part A: Polym. Chem.*, 2004, 42, pp. 1293-1309.

Non-Patent Document 2: *Macromolecules*, 1999, 32, pp. 2061-2064.

SUMMARY OF THE INVENTION

Problems to be Solved by the Invention

The inventors earlier discovered that, when producing a hyperbranched aromatic polyamide by reacting a benzenetricarboxylic acid with a diamine, the aromatic polyamide obtained by adding a monofunctional substance capable of reacting with the carboxyl groups on the benzenetricarboxylic acid so as to cap some of the reactive ends and thereby control the degree of hyperbranching has a good solubility in organic solvents while retaining heat resistance and transparency, and thus can be advantageously used as the base polymer of a film-forming composition when fabricating electronic devices (International Application PCT/JP2012/054505).

By using this polymer, a thin-film having the properties of a high heat resistance, high transparency and high refractive index can be fabricated. However, because this polymer is one in which carboxyl groups bonded directly to benzene rings serve as the crosslinking sites, the crosslink reactivity is low, the range of choice of crosslinking agents is small, the crosslink density of the cured product is low, and there are cases where cracks develop during thick-film production. Moreover, when the polymer is rendered into a thin-film, problems such as a tendency to absorb water and inadequate alkali resistance also exist. Hence, depending on the intended use, there exists a desire for improvements in these characteristics.

It is therefore an object of the present invention to provide an aromatic polyamide which has an improved solubility in organic solvents while retaining heat resistance and transparency. A further object of the invention is to provide a film-forming composition which includes such an aromatic polyamide and is capable of thick-film formation.

Means for Solving the Problems

As a result of extensive investigations, the inventors have discovered that, when producing hyperbranched aromatic polyamides by reacting a benzenetricarboxylic acid with a diamine, aromatic polyamides in which crosslink-forming groups capable of reacting with a crosslinking agent have been introduced onto the polymer ends by the addition of an end-capping compound having a functional group capable of reacting with the carboxylic groups on the benzenetricarboxylic acid and having also a crosslinkable group are endowed with a good heat resistance, transparency and solubility in organic solvents, do not develop cracks, and provide film-forming compositions capable of forming thick-films of good transparency and good acid and alkali resistance.

Accordingly, the invention provides:
1. An aromatic polyamide which includes a recurring unit structure of formula (1) below

[Chemical Formula 1]

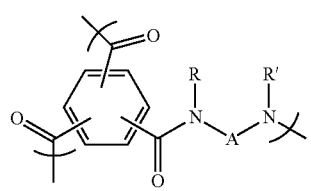

(1)

(wherein R and R' are each independently a hydrogen atom, an alkyl group, an alkoxy group, an aryl group or an aralkyl group; and A is at least one moiety selected from the group consisting of moieties of formulas (2) to (26) below
[Chemical Formula 2]
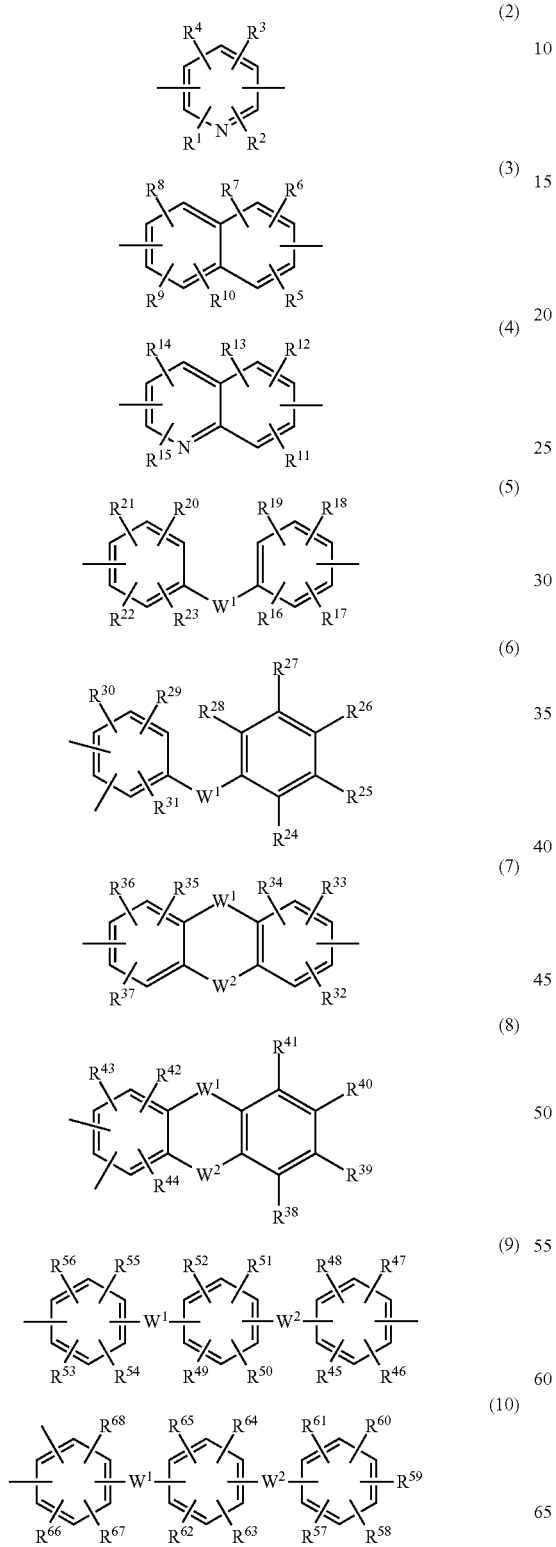
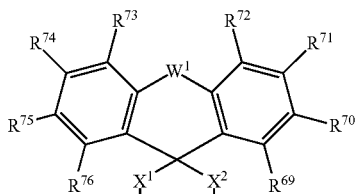
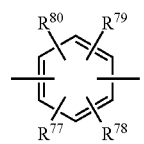
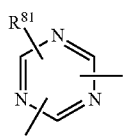
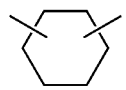
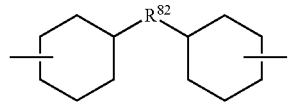
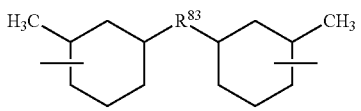
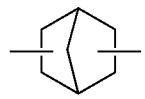
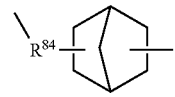
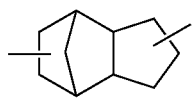
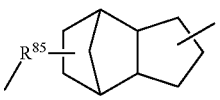
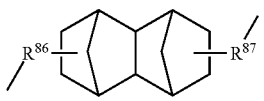

-continued

(23)
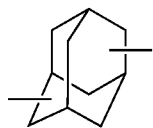

(24)
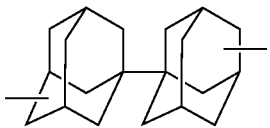

(25)
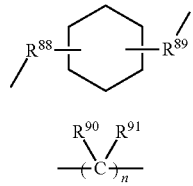

(26)

(in which $R^1$ to $R^{81}$ are each independently a hydrogen atom, a halogen atom, a carboxyl group, a sulfone group, an alkyl group of 1 to 10 carbons which may have a branched structure, an alkenyl group of 1 to 10 carbons which may have a branched structure, or an alkoxy group of 1 to 10 carbons which may have a branched structure; $R^{82}$ to $R^{89}$ are each independently an alkylene group of 1 to 10 carbons which may have a branched structure; $R^{90}$ and $R^{91}$ are each independently a hydrogen atom or an alkyl group of 1 to 10 carbons which may have a branched structure, with the proviso that $R^{90}$ and $R^{91}$ may together form a ring; $W^1$ and $W^2$ are each independently a single bond, —$(CR^{92}R^{93})_m$— ($R^{92}$ and $R^{93}$ being each independently a hydrogen atom or an alkyl group of 1 to 10 carbons which may have a branched structure, with the proviso that $R^{92}$ and $R^{93}$ may together form a ring; and m being an integer from 1 to 10), O, S, SO, $SO_2$, $NR^{94}$, C=O, C(=O)O, OC(=O), OC(=O)O, $CONR^{95}$, $NR^{96}CO$ or $NR^{97}CONR^{98}$ ($R^{94}$ to $R^{98}$ being each independently a hydrogen atom or an alkyl group of 1 to 10 carbons which may have a branched structure); $X^1$ and $X^2$ are each independently a single bond, an alkylene group of 1 to 10 carbons which may have a branched structure, or a moiety of formula (27) below

[Chemical Formula 3]

(27)
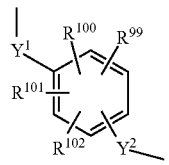

($R^{99}$ to $R^{102}$ being each independently a hydrogen atom, a halogen atom, a carboxyl group, a sulfone group, an alkyl group of 1 to 10 carbons which may have a branched structure, or an alkoxy group of 1 to 10 carbons which may have a branched structure; and $Y^1$ and $Y^2$ being each independently a single bond or an alkylene group of 1 to 10 carbons which may have a branched structure); and n is an integer from 1 to 20)), and has a weight-average molecular weight, as measured by gel permeation chromatography against a polystyrene standard, of between 1,000 and 100,000, which aromatic polyamide is characterized by being capped at a benzenetricarboxylic acid end or a diamine end with an end-capping compound having a crosslinkable group;

2. The aromatic polyamide of 1 above which is obtained by reacting a benzenetricarboxylic acid or a derivative thereof with a diamine compound in the presence of a monofunctional substance having one functional group capable of reacting with the benzenetricarboxylic acid or a derivative thereof, and which is capped at a benzenetricarboxylic acid end or a diamine end with an end-capping compound having a crosslinkable group;

3. The aromatic polyamide of 1 or 2 above which is obtained by reacting a benzenetricarboxylic acid or a derivative thereof with a diamine compound in the presence of both a monofunctional substance having one functional group capable of reacting with the benzenetricarboxylic acid or a derivative thereof and also an end-capping compound having a functional group capable of reacting with the benzenetricarboxylic acid or a derivative thereof and having also a crosslinkable group;

4. The aromatic polyamide of 1 or 2 above which is obtained by reacting a benzenetricarboxylic acid or a derivative thereof with a diamine compound, in the presence of a monofunctional substance having one functional group capable of reacting with the benzenetricarboxylic acid or a derivative thereof, and by additional reaction in the presence of an end-capping compound having a functional group capable of reacting with the diamine end and having also a crosslinkable group;

5. The aromatic polyamide of any one of 1 to 4 above, wherein A is at least one moiety selected from the group consisting of moieties of above formulas (2), (5), (6), (7), (11), (13) and (26);

6. The aromatic polyamide of any one of 1 to 4 above, wherein A is at least one moiety selected from the group consisting of moieties of the following formulas

[Chemical Formula 4]

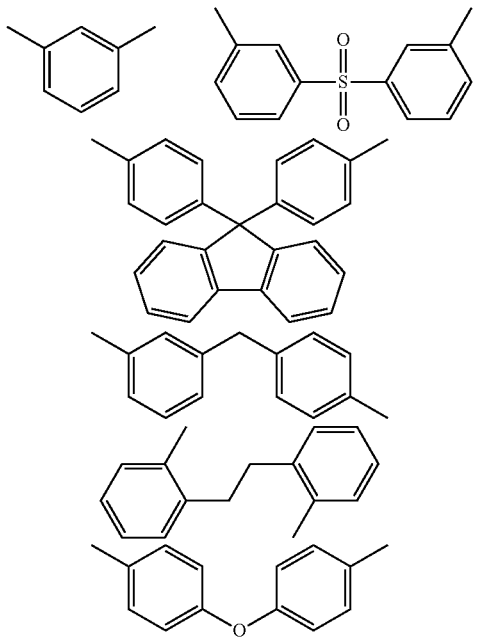

-continued

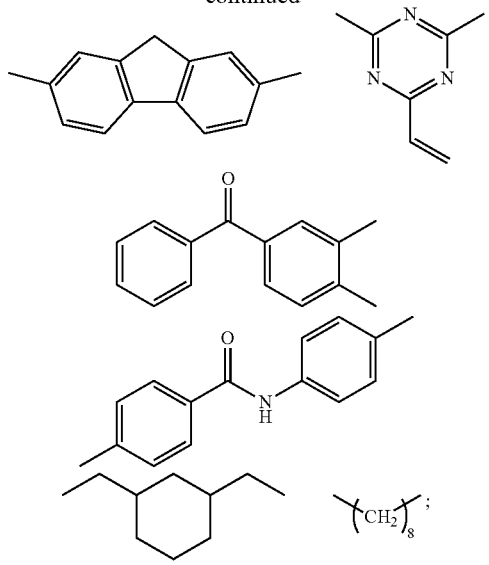

7. The aromatic polyamide of 3 above, wherein the end-capping compound is a compound having an amino group and a hydroxyl group, a compound having an amino group and a carbon-carbon double bond, or a compound having a hydroxyl group and a (meth)acryloxy group;
8. The aromatic polyamide of 7 above, wherein the end-capping compound is at least one selected from among 1-amino-2-propanol, 2-aminophenol, 3-aminophenol, 4-aminophenol, aminostyrene, 2-hydroxyethyl (meth)acrylate, 2-hydroxypropyl (meth)acrylate, 2-hydroxybutyl (meth)acrylate, 2-hydroxyethyl acrylate, 2-hydroxypropyl acrylate, 2-hydroxy-3-phenyloxypropyl (meth)acrylate, 4-hydroxybutyl acrylate, neopentyl glycol mono(meth)acrylate, 4-hydroxycyclohexyl (meth)acrylate, 1,6-hexanediol mono(meth)acrylate, pentaerythritol penta(meth)acrylate and dipentaerythritol penta(meth)acrylate;
9. The aromatic polyamide of 4 above, wherein the end-capping compound is a compound having a carboxyl group or a derivative group thereof and having a carbon-carbon double bond;
10. The aromatic polyamide of 9 above, wherein the end-capping compound is (meth)acrylic acid or a derivative thereof;
11. The aromatic polyamide of any one of 2 to 10 above, wherein the monofunctional substance is aniline, phenol or methanol;
12. A film-forming composition comprising the aromatic polyamide according to any one of 1 to 11 above;
13. A film comprising the aromatic polyamide according to any one of 1 to 11 above;
14. An electronic device comprising a base material and the film of 13 above formed on the base material; and
15. An optical member comprising a base material and the film of 13 above formed on the base material.

Advantageous Effects of the Invention

The aromatic polyamides of the invention, owing to their excellent solubility and ability to dissolve in various organic solvents, are easily formed or molded. If full advantage is taken of these excellent physical properties, such aromatic polyamides are likely to see the development of uses in diverse fields such as textiles, molding materials, composite materials, and electrical and electronic components.

The aromatic polyamides of the invention also have a good heat resistance and transparency. Hence, by using these polyamides, it is possible to form thick-films which have an excellent transparency and heat resistance, are not subject to crack formation, and moreover have excellent acid and alkali resistances.

Films that have been produced using the inventive aromatic polyamides and are endowed with these properties can be advantageously used as components in the fabrication of electronic devices such as liquid-crystal displays, organic electroluminescence (EL) displays, optical semiconductor devices (LEDs), solid-state image sensors, organic thin-film solar cells, dye-sensitized solar cells and organic thin-film transistors (TFTs).

BRIEF DESCRIPTION OF THE DIAGRAMS

Figure 2:
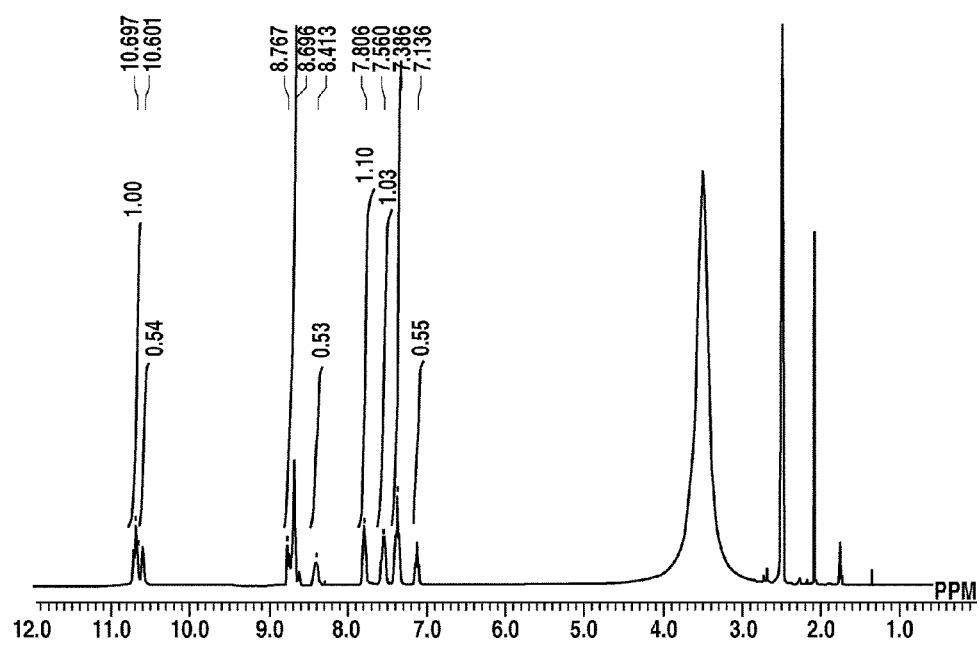
Figure 3:
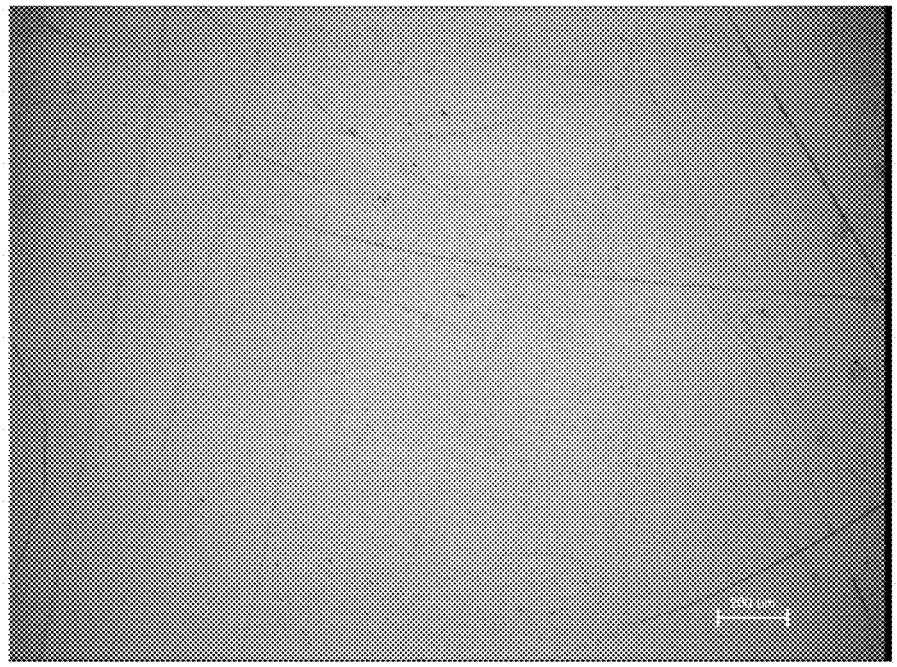
Figure 4:
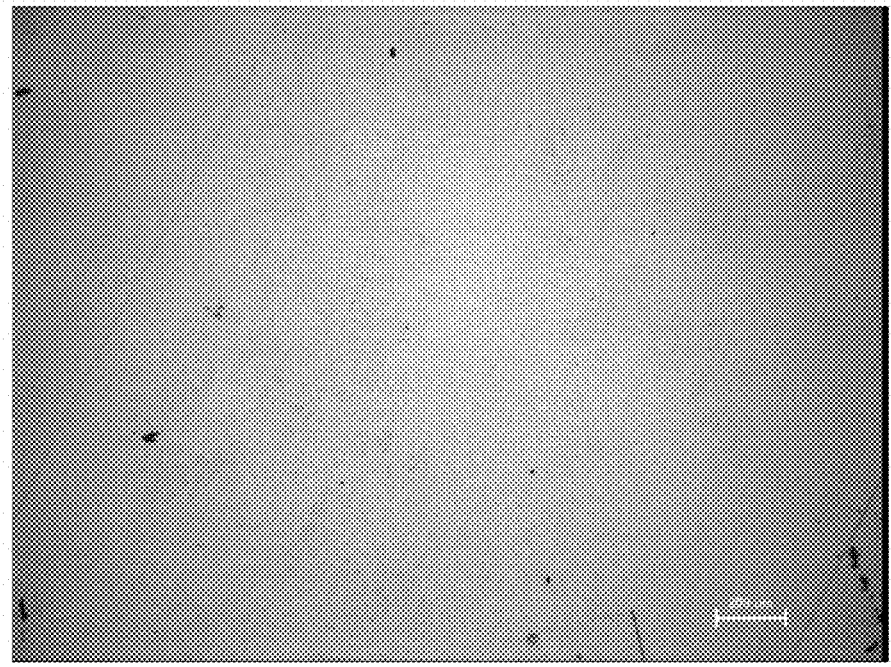
Figure 5:
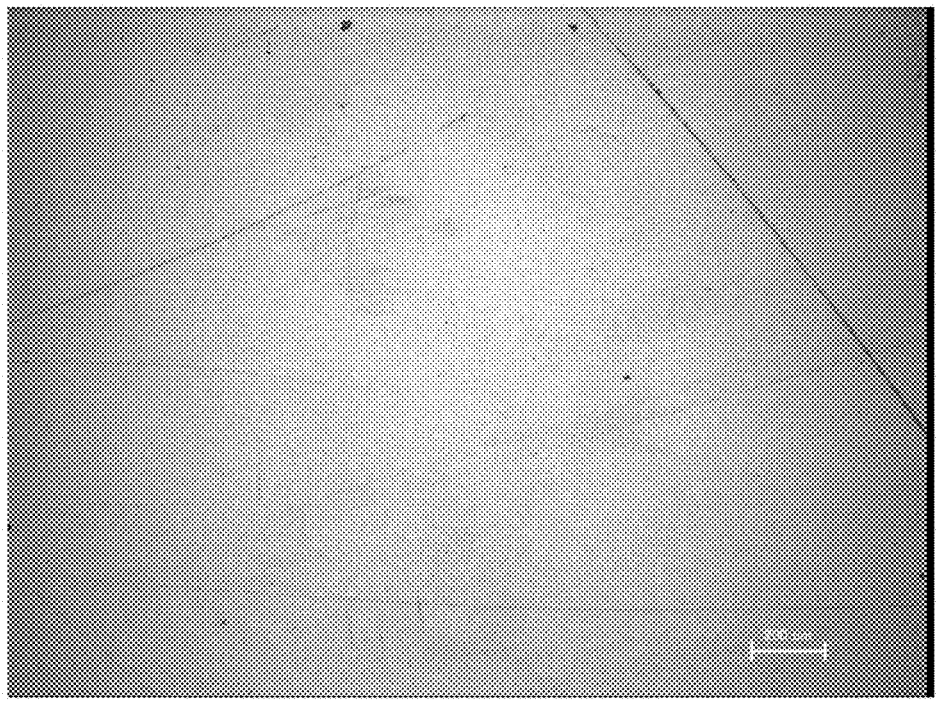
Figure 6:
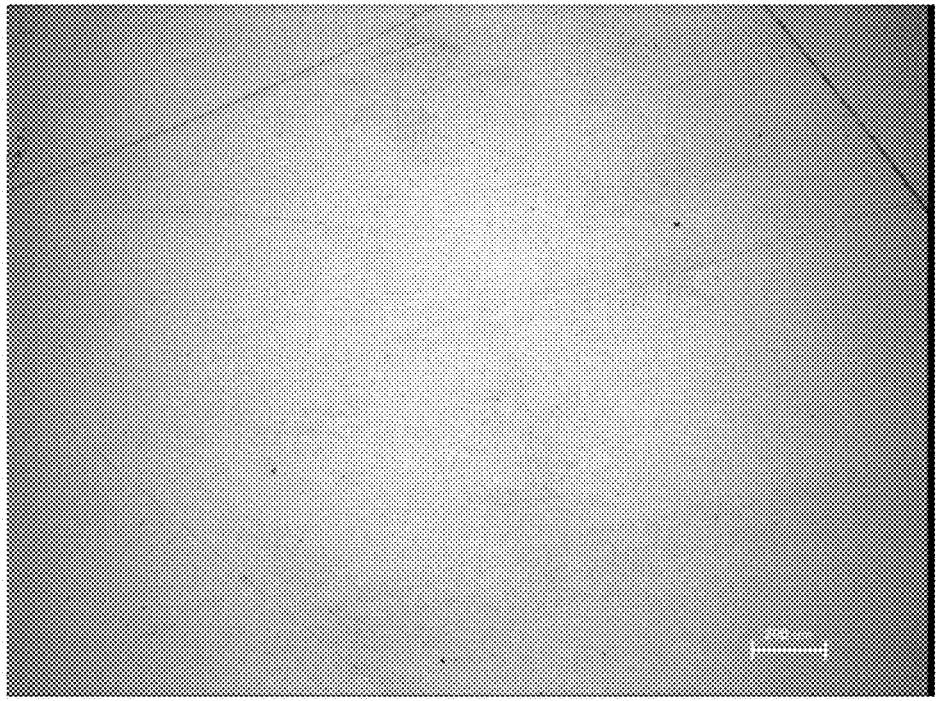
Figure 7:
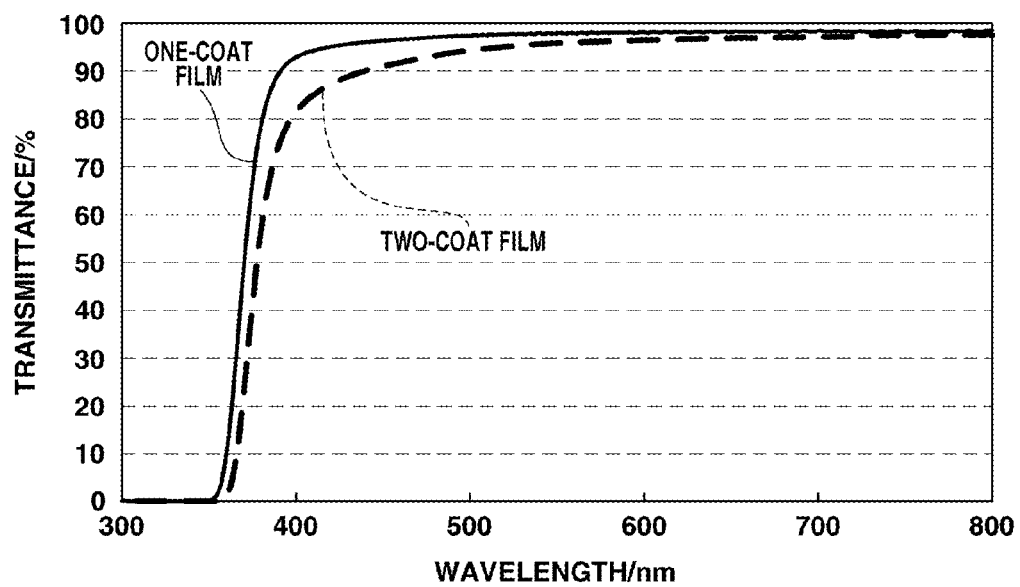
Figure 8:
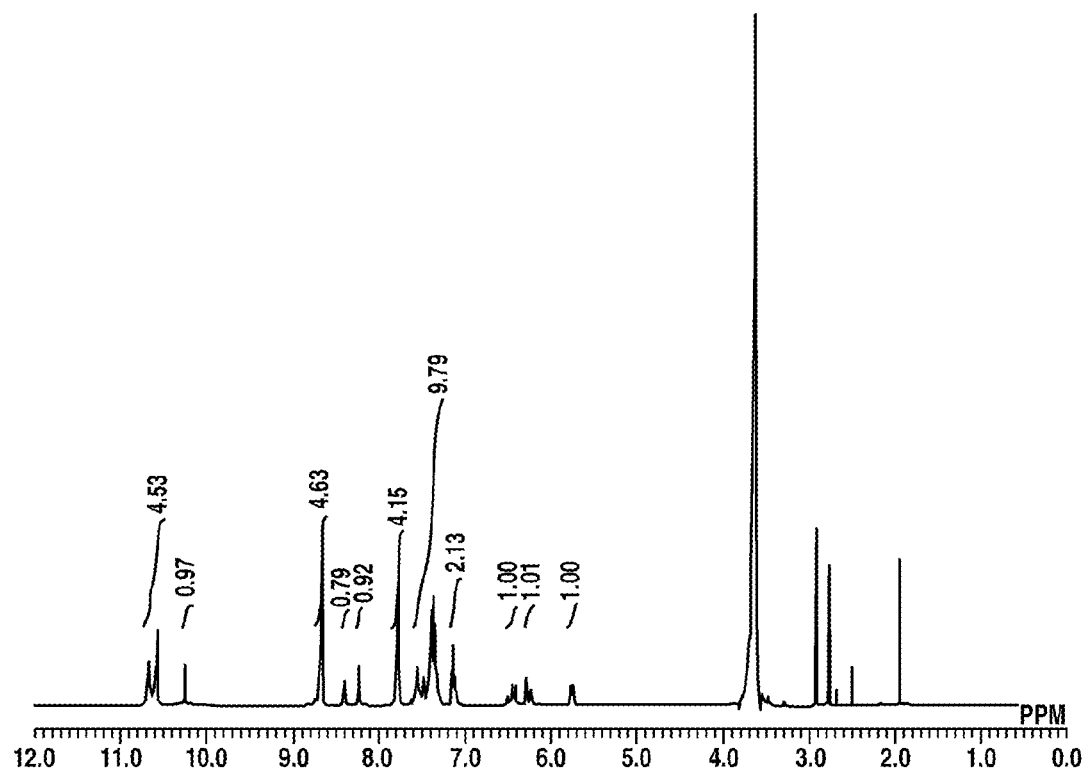
Figure 9:
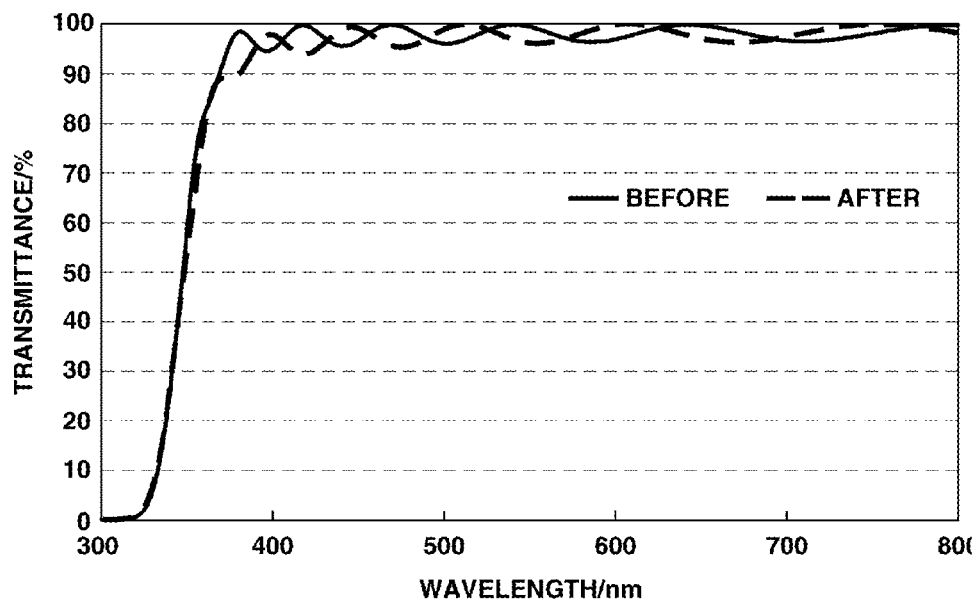
Figure 10:
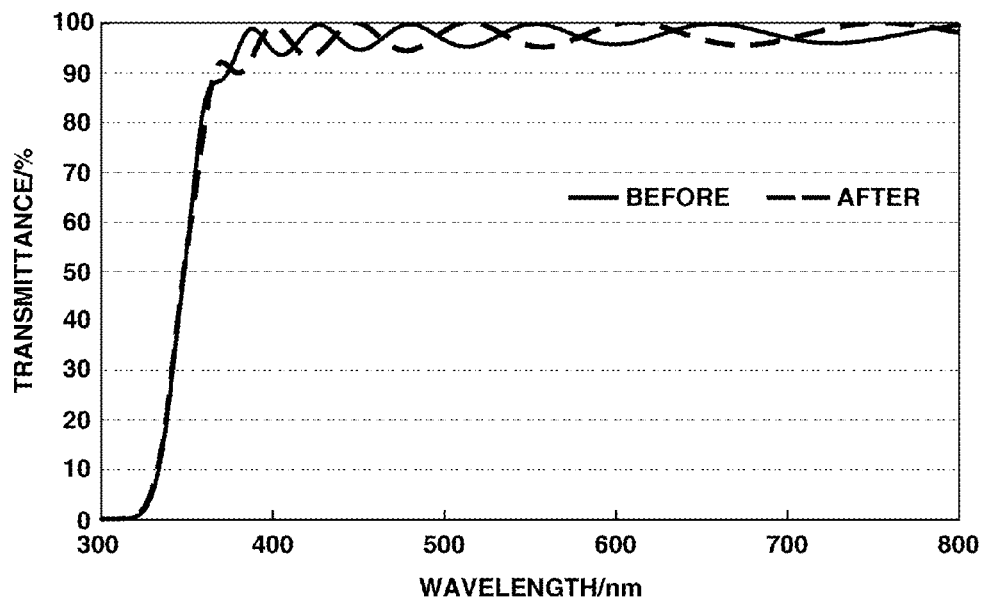
Figure 11:
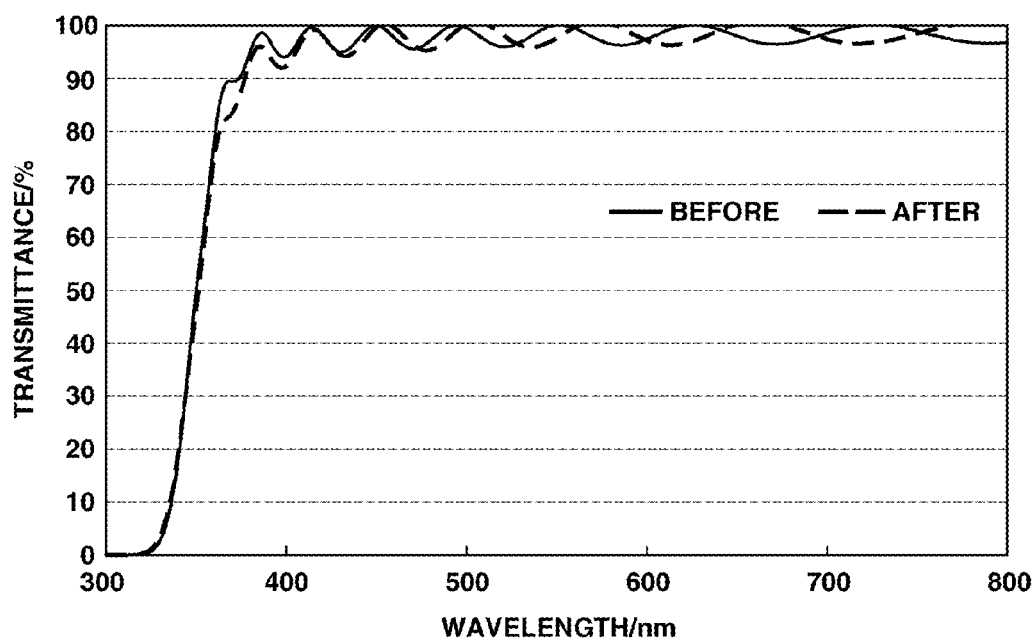
Figure 12:
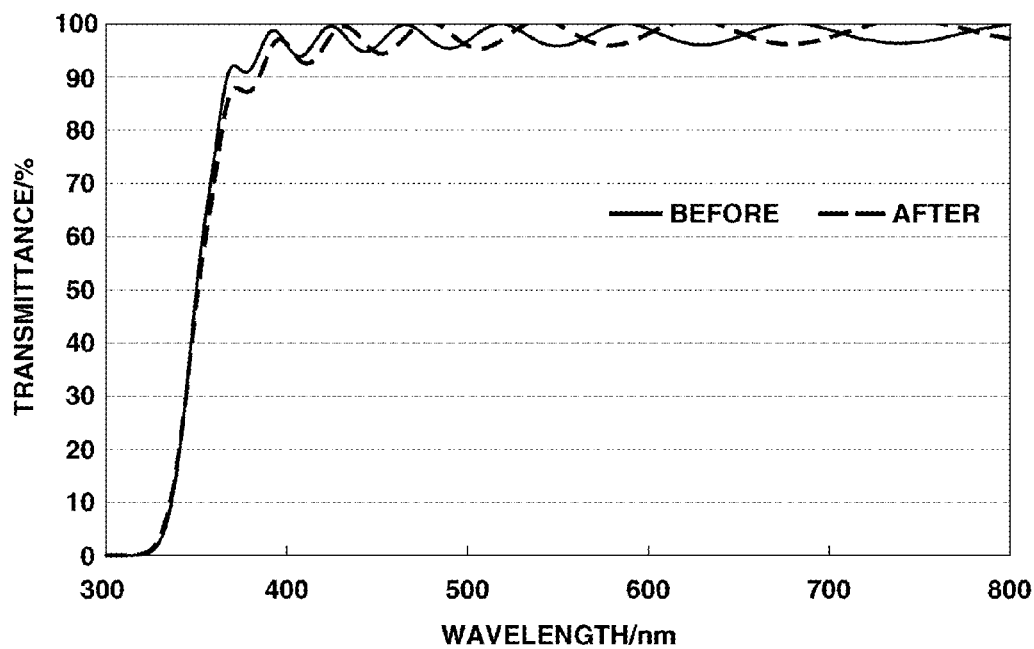
Figure 13:
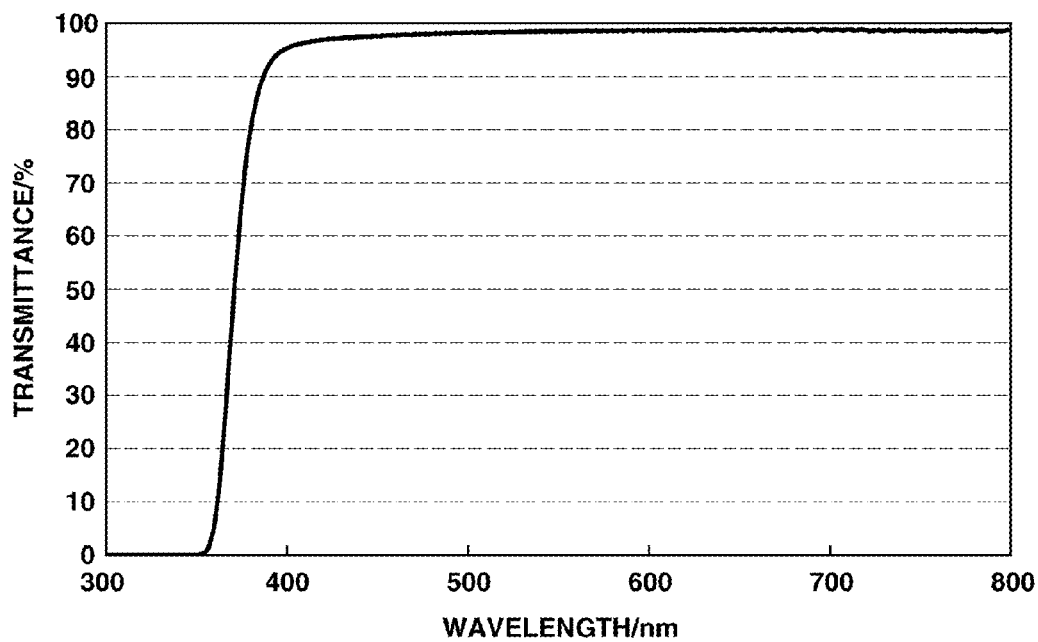
Figure 14:
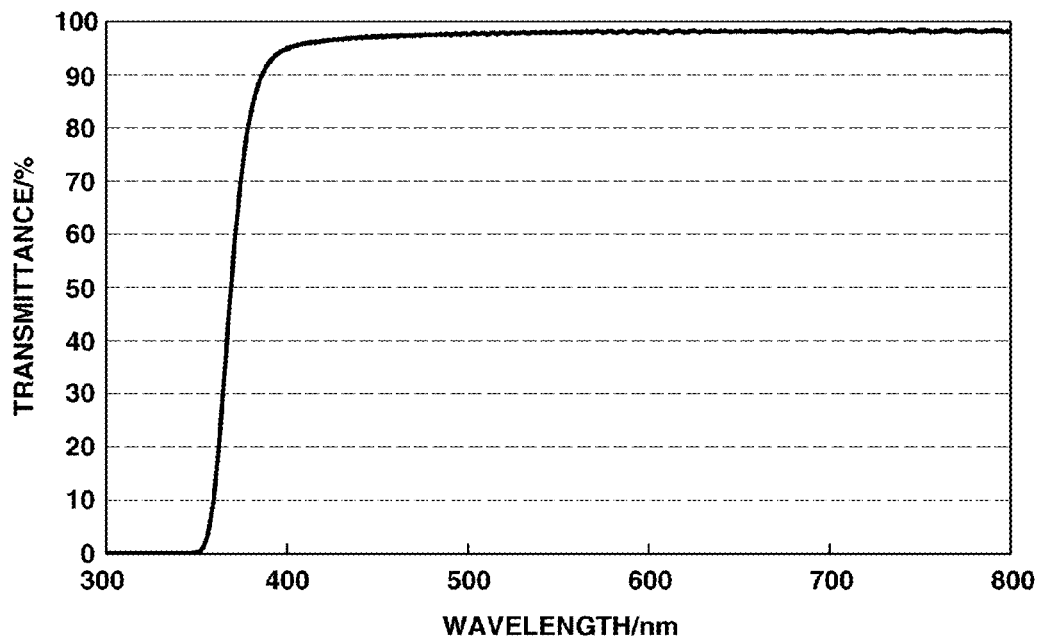

FIG. 1 is an $^1$H-NMR spectrum of the aromatic polyamide HPmDAP obtained in Example 1.
FIG. 2 is an $^1$H-NMR spectrum of the aromatic polyamide TmPDA-An obtained in Comparative Example 1.
FIG. 3 is an optical micrograph of a thin-film produced from HPmDAP-MF, after the film was subjected to an acid resistance test.
FIG. 4 is an optical micrograph of a thin-film produced from HPmDAP-MF, after the film was subjected to an alkali resistance test.
FIG. 5 is an optical micrograph of a thin-film produced from HPmDAP-E, after the film was subjected to an acid resistance test.
FIG. 6 is an optical micrograph of a thin-film produced from HPmDAP-E, after the film was subjected to an alkali resistance test.
FIG. 7 is a chart showing the results of transmittance measurements in the visible region for the one-coat film and the two-coat film produced in Example 4.
FIG. 8 is an $^1$H-NMR spectrum of the aromatic polyamide HPmDA-Acry obtained in Example 5.
FIG. 9 is a diagram showing the results of transmittance measurements, before and after a heat-resistance test, on a thin-film obtained from the HPmDA-Acry-12E prepared in Example 6.
FIG. 10 is a diagram showing the results of transmittance measurements, before and after a heat-resistance test, on a thin-film obtained from the HPmDA-Acry-KRM prepared in Example 7.
FIG. 11 is a diagram showing the results of transmittance measurements, before and after a heat-resistance test, on a thin-film obtained from the HPmDA-Acry-EP1 prepared in Example 8.
FIG. 12 is a diagram showing the results of transmittance measurements, before and after a heat-resistance test, on a thin-film obtained from the HPmDA-Acry-EP2 prepared in Example 9.
FIG. 13 is a diagram showing the results of transmittance measurements on the thick-film produced in Example 10.
FIG. 14 is a diagram showing the results of transmittance measurements on the thick-film produced in Example 11.

EMBODIMENT FOR CARRYING OUT THE INVENTION

The invention is described more fully below.
The aromatic polyamide according to this invention is an aromatic polyamide which includes a recurring unit structure of formula (1) below and has a weight-average molecular weight, as measured by gel permeation chromatography against a polystyrene standard, of between 1,000 and 100,000. A benzenetricarboxylic acid end or a diamine end of the polyamide is capped with an end-capping compound having a crosslinkable group.

[Chemical Formula 5]

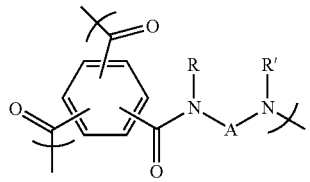

(1)

In the formula, R and R' are each independently a hydrogen atom, an alkyl group, an alkoxy group, an aryl group or an aralkyl group.

The number of carbons on the alkyl group, although not particularly limited, is preferably from 1 to 20. To further increase the heat resistance of the polyamide, the number of carbons is more preferably from 1 to 10, and even more preferably from 1 to 3. The structure of the alkyl group may be acyclic, branched or cyclic.

Illustrative examples of the alkyl group include methyl, ethyl, n-propyl, isopropyl, cyclopropyl, n-butyl, isobutyl, s-butyl, t-butyl, cyclobutyl, 1-methylcyclopropyl, 2-methylcyclopropyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, cyclopentyl, 1-methylcyclobutyl, 2-methylcyclobutyl, 3-methylcyclobutyl, 1,2-dimethylcyclopropyl, 2,3-dimethylcyclopropyl, 1-ethylcyclopropyl, 2-ethylcyclopropyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, cyclohexyl, 1-methylcyclopentyl, 2-methylcyclopentyl, 3-methylcyclopentyl, 1-ethylcyclobutyl, 2-ethylcyclobutyl, 3-ethylcyclobutyl, 1,2-dimethylcyclobutyl, 1,3-dimethylcyclobutyl, 2,2-dimethylcyclobutyl, 2,3-dimethylcyclobutyl, 2,4-dimethylcyclobutyl, 3,3-dimethylcyclobutyl, 1-n-propylcyclopropyl, 2-n-propylcyclopropyl, 1-isopropylcyclopropyl, 2-isopropylcyclopropyl, 1,2,2-trimethylcyclopropyl, 1,2,3-trimethylcyclopropyl, 2,2,3-trimethylcyclopropyl, 1-ethyl-2-methylcyclopropyl, 2-ethyl-1-methylcyclopropyl, 2-ethyl-2-methylcyclopropyl and 2-ethyl-3-methylcyclopropyl.

The number of carbons on the alkoxy group, although not particularly limited, is preferably from 1 to 20. To further increase the heat resistance of the polyamide, the number of carbons is more preferably from 1 to 10, and even more preferably from 1 to 3. The structure of the alkyl moiety on the alkoxy group may be acyclic, branched or cyclic.

Illustrative examples of the alkoxy group include methoxy, ethoxy, n-propoxy, isopropoxy, n-butoxy, isobutoxy, s-butoxy, t-butoxy, n-pentoxy, 1-methyl-n-butoxy, 2-methyl-n-butoxy, 3-methyl-n-butoxy, 1,1-dimethyl-n-propoxy, 1,2-dimethyl-n-propoxy, 2,2-dimethyl-n-propoxy, 1-ethyl-n-propoxy, n-hexyloxy, 1-methyl-n-pentyloxy, 2-methyl-n-pentyloxy, 3-methyl-n-pentyloxy, 4-methyl-n-pentyloxy, 1,1-dimethyl-n-butoxy, 1,2-dimethyl-n-butoxy, 1,3-dimethyl-n-butoxy, 2,2-dimethyl-n-butoxy, 2,3-dimethyl-n-butoxy, 3,3-dimethyl-n-butoxy, 1-ethyl-n-butoxy, 2-ethyl-n-butoxy, 1,1,2-trimethyl-n-propoxy, 1,2,2-trimethyl-n-propoxy, 1-ethyl-1-methyl-n-propoxy and 1-ethyl-2-methyl-n-propoxy.

The number of carbons on the aryl group, although not particularly limited, is preferably from 6 to 40. To further increase the heat resistance of the polyamide, the number of carbons is more preferably from 6 to 16, and even more preferably from 6 to 13.

Illustrative examples of the aryl group include phenyl, o-chlorophenyl, m-chlorophenyl, p-chlorophenyl, o-fluorophenyl, p-fluorophenyl, o-methoxyphenyl, p-methoxyphenyl, p-nitrophenyl, p-cyanophenyl, α-naphthyl, β-naphthyl, o-biphenylyl, m-biphenylyl, p-biphenylyl, 1-anthryl, 2-anthryl, 9-anthryl, 1-phenanthryl, 2-phenanthryl, 3-phenanthryl, 4-phenanthryl and 9 phenanthryl.

The number of carbons on the aralkyl group, although not particularly limited, is preferably from 7 to 20. The alkyl moiety thereon may be acyclic, branched or cyclic.

Illustrative examples include benzyl, p-methylphenylmethyl, m-methylphenylmethyl, o-ethylphenylmethyl, m-ethylphenylmethyl, p-ethylphenylmethyl, 2-propylphenylmethyl, 4-isopropylphenylmethyl, 4-isobutylphenylmethyl and α-naphthylmethyl.

A in formula (1) is at least one moiety selected from moieties of formulas (2) to (26) below.

[Chemical Formula 6]

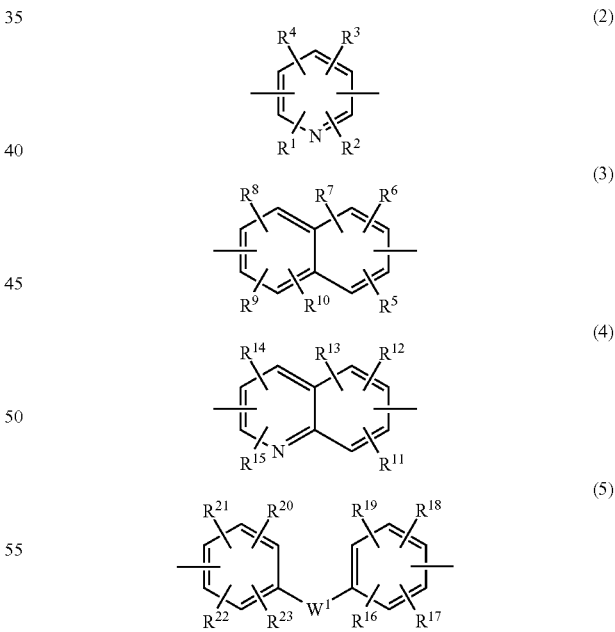

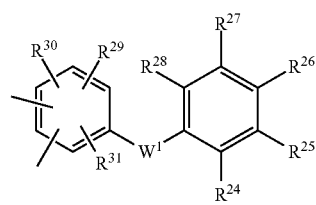

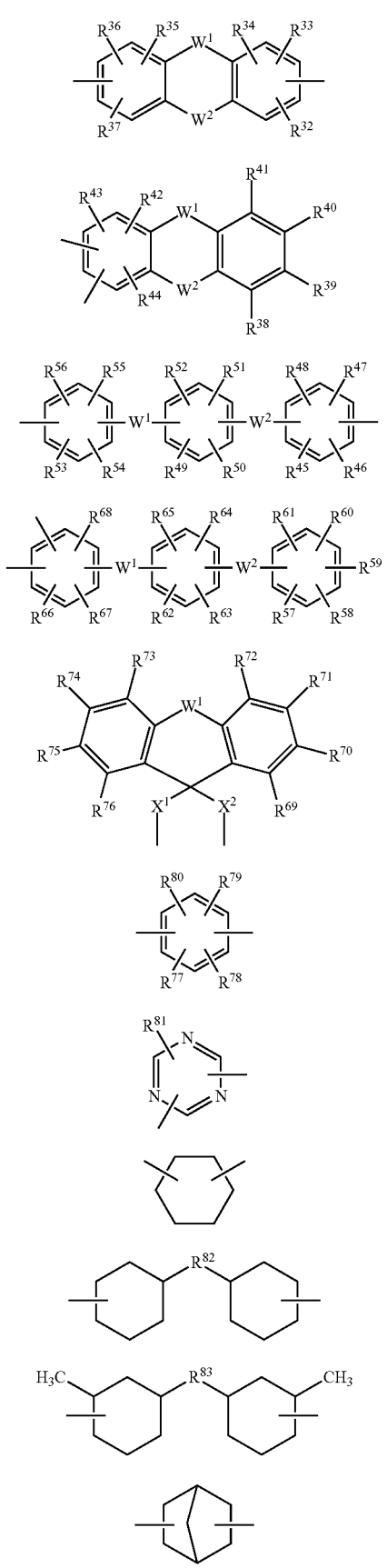
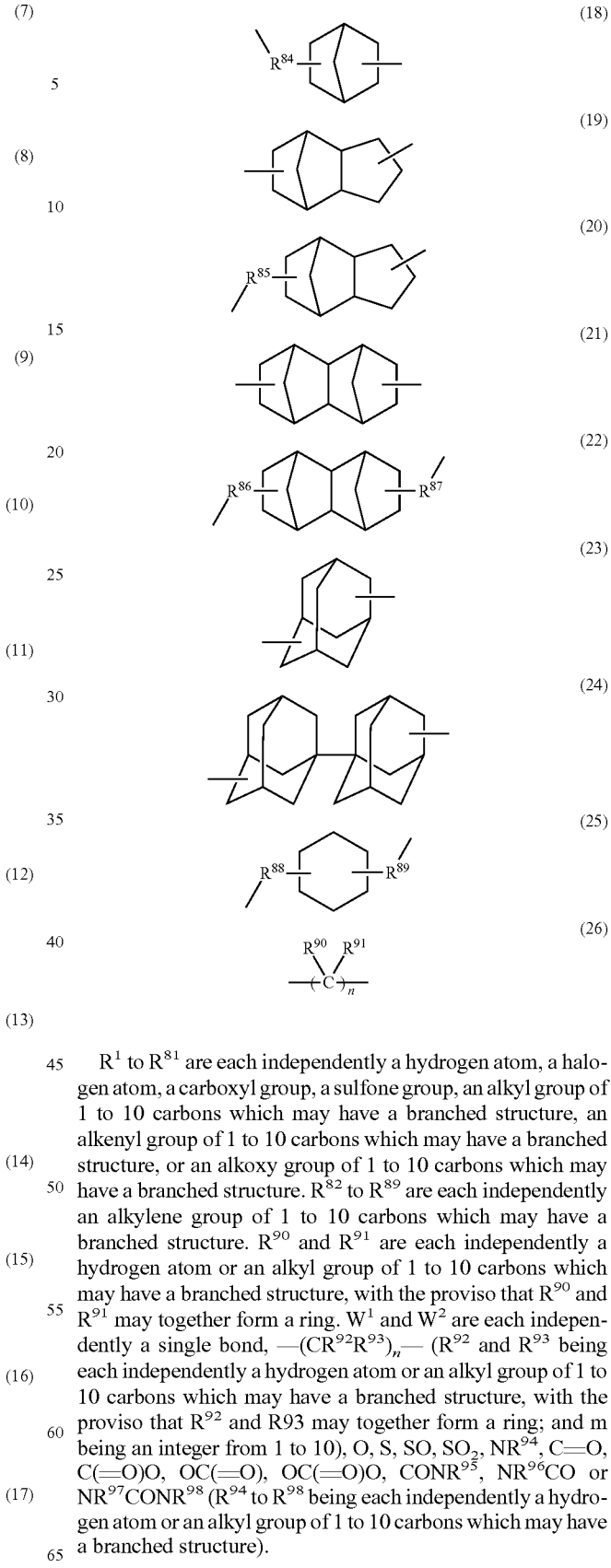

$R^1$ to $R^{81}$ are each independently a hydrogen atom, a halogen atom, a carboxyl group, a sulfone group, an alkyl group of 1 to 10 carbons which may have a branched structure, an alkenyl group of 1 to 10 carbons which may have a branched structure, or an alkoxy group of 1 to 10 carbons which may have a branched structure. $R^{82}$ to $R^{89}$ are each independently an alkylene group of 1 to 10 carbons which may have a branched structure. $R^{90}$ and $R^{91}$ are each independently a hydrogen atom or an alkyl group of 1 to 10 carbons which may have a branched structure, with the proviso that $R^{90}$ and $R^{91}$ may together form a ring. $W^1$ and $W^2$ are each independently a single bond, $—(CR^{92}R^{93})_n—$ ($R^{92}$ and $R^{93}$ being each independently a hydrogen atom or an alkyl group of 1 to 10 carbons which may have a branched structure, with the proviso that $R^{92}$ and R93 may together form a ring; and m being an integer from 1 to 10), O, S, SO, $SO_2$, $NR^{94}$, C=O, C(=O)O, OC(=O), OC(=O)O, $CONR^{95}$, $NR^{96}CO$ or $NR^{97}CONR^{98}$ ($R^{94}$ to $R^{98}$ being each independently a hydrogen atom or an alkyl group of 1 to 10 carbons which may have a branched structure).

The halogen atom is exemplified by a fluorine atom, a chlorine atom, a bromine atom and an iodine atom.

Illustrative examples of alkenyl groups of 1 to 10 carbons which may have a branched structure include vinyl, allyl (2-propenyl), 3-butenyl and 4-pentenyl.

Illustrative examples of alkylene groups of 1 to 10 carbons which may have a branched structure include methylene, ethylene, propylene, trimethylene, tetramethylene and pentamethylene.

These alkyl groups and alkoxy groups are exemplified by the same groups as mentioned above.

$X^1$ and $X^2$ are each independently a single bond, an alkylene group of 1 to 10 carbons which may have a branched structure, or a group of formula (27) below.

[Chemical Formula 7]

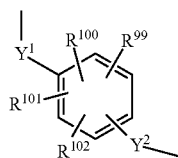

(27)

Here, $R^{99}$ to $R^{102}$ are each independently a hydrogen atom, a halogen atom, a carboxyl group, a sulfone group, an alkyl group of 1 to 10 carbons which may have a branched structure, or an alkoxy group of 1 to 10 carbons which may have a branched structure. $Y^1$ and $Y^2$ are each independently a single bond or an alkylene group of 1 to 10 carbons which may have a branched structure.

These halogen atoms, alkyl groups, alkoxy groups and alkylene groups are exemplified by the same groups as mentioned above.

The letter "n" is an integer from 1 to 20.

In this invention, A is preferably at least one moiety from among those of formulas (2), (5), (6), (7), (11), (13) and (26). Specific examples include, but are not limited to, those of the following formulas.

[Chemical Formula 8]

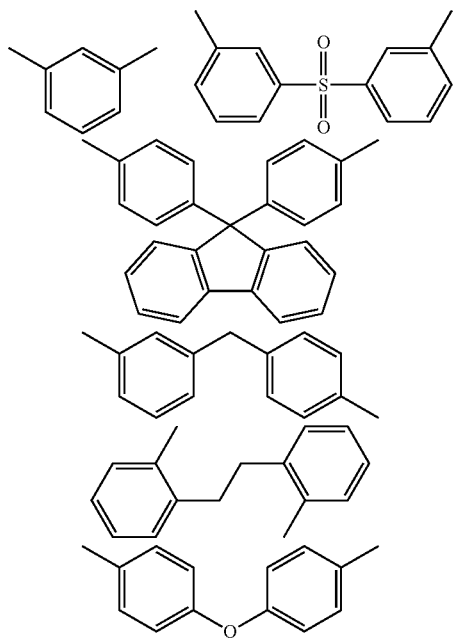

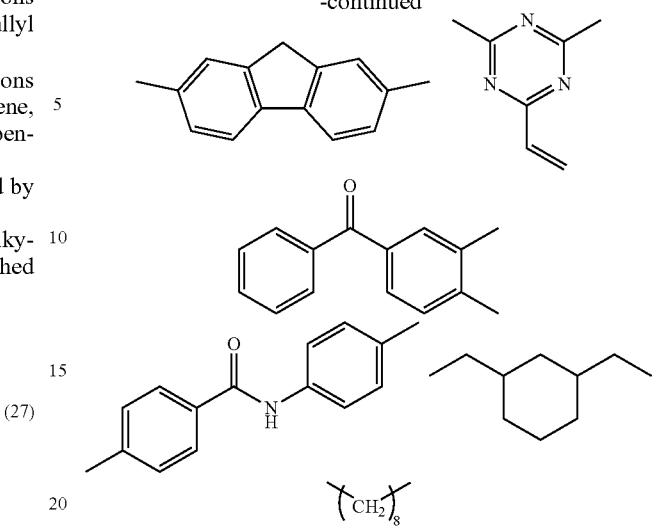

The aromatic polyamide of the invention has a weight-average molecular weight of between 1,000 and 100,000. To further enhance the heat resistance, the weight-average molecular weight is preferably at least 2,000. To further increase the solubility and lower the viscosity of the resulting solution, the weight-average molecular weight is preferably not more than 50,000, and more preferably not more than 20,000.

The weight-average molecular weight in the invention is the weight-average molecular weight, as measured by gel permeation chromatography (GPC) against a polystyrene standard.

Exemplary methods for preparing the aromatic polyamide of the invention are described.

An aromatic polyamide in which a benzenetricarboxylic acid end has been end-capped can be obtained by reacting a benzenetricarboxylic acid or a derivative thereof with a diamine compound in the presence of an end-capping compound having a functional group capable of reacting with benzenetricarboxylic acid or a derivative thereof and having also a crosslinkable group.

By way of illustration, as shown in Schemes 1 and 2 below, an aromatic polyamide having the recurring structure (28) can be obtained by reacting a 1,3,5-benzenetricarbonyl trihalide (29) with m-phenylenediamine (30) in the presence of the end-capping compound 1-amino-2-propanol (31) and within a suitable organic solvent.

[Chemical Formula 9]

Scheme 1

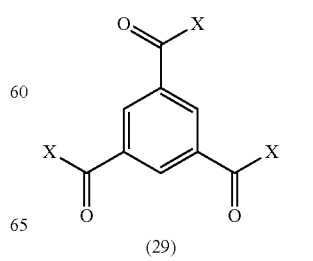

(29)

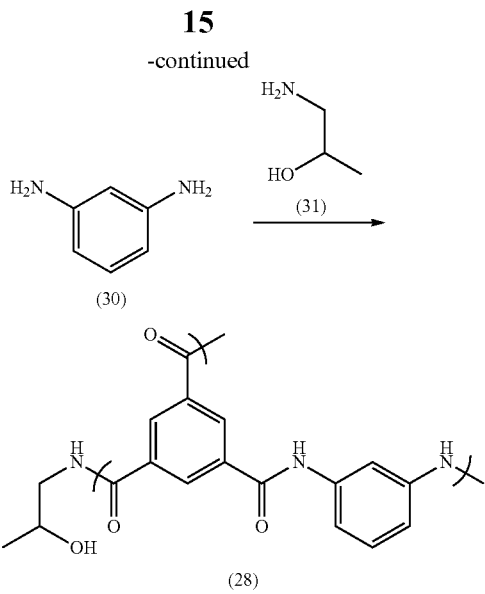

In the above formula, each occurrence of X is independently a halogen atom.

Alternatively, an aromatic polyamide in which a diamine end has been end-capped can be obtained by reacting a benzenetricarboxylic acid or a derivative thereof with a diamine compound to form a product having a diamine end, and by additional reaction in the presence of an end-capping compound having a functional group capable of reacting with the diamine end and having also a crosslinkable group.

By way of illustration, as shown in Scheme 2 below, an aromatic polyamide having the recurring structure (33) can be obtained by reacting a 1,3,5-benzenetricarbonyl trihalide (29) with m-phenylenediamine (30) in a suitable organic solvent, then adding the end-capping compound acryloyl chloride (32) and carrying out reaction within a suitable organic solvent.

[Chemical Formula 10]

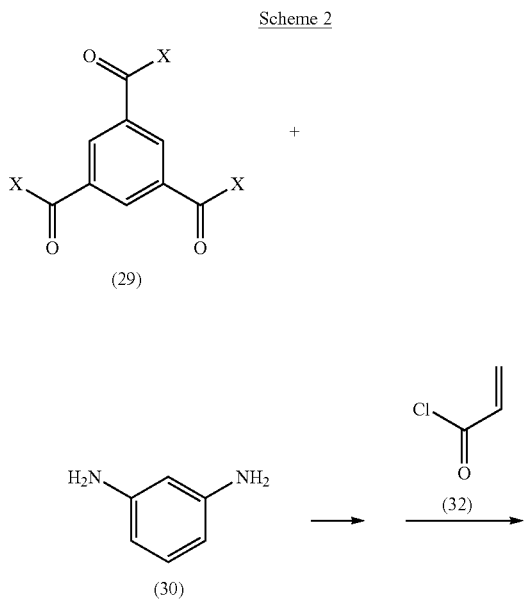

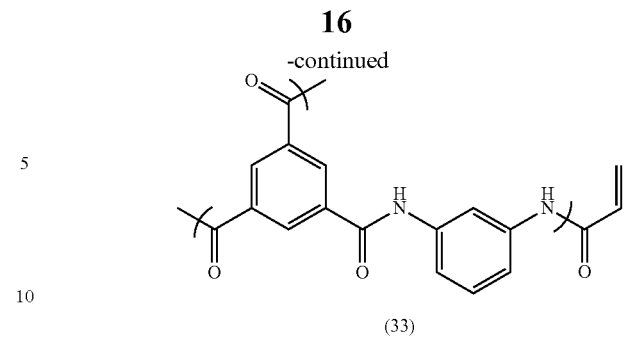

In the above formula, each occurrence of X is independently a halogen atom.

In the reactions of above Schemes 1 and 2, in order to cap some of the reactive ends and thereby control the degree of branching in the hyperbranched polymer, a monofunctional substance having a single functional group capable of reacting with the benzenetricarboxylic acid or a derivative thereof may be added.

Specifically, as shown below in Scheme 3, an aromatic polyamide having the recurring structure (28') can be obtained by reacting a 1,3,5-benzenetricarbonyl trihalide (29) with m-phenylenediamine (30) in the presence of the monofunctional substance aniline (34) and the end-capping compound 1-amino-2-propanol (31) within a suitable organic solvent.

[Chemical Formula 11]

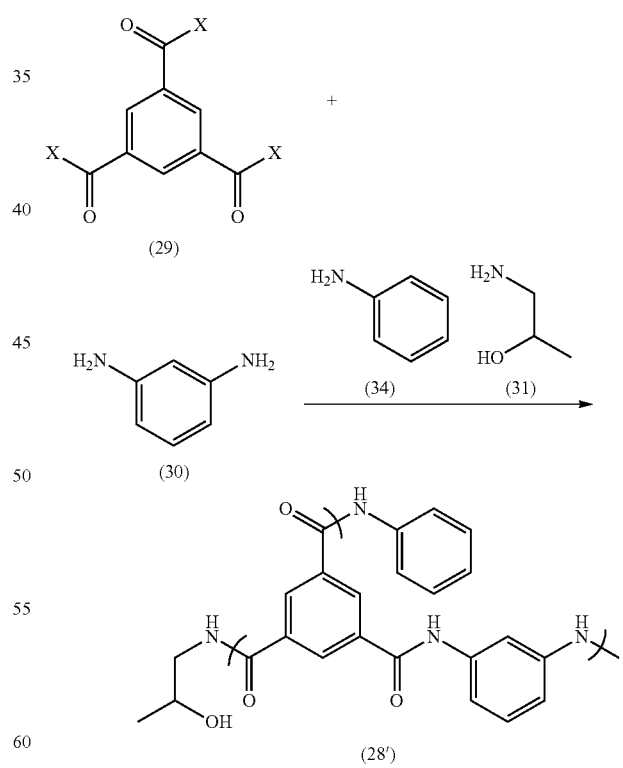

In the above formula, each occurrence of X is independently a halogen atom.

Alternatively, as shown in Scheme 4 below, an aromatic polyamide having the recurring structure (33') can be obtained by reacting a 1,3,5-benzenetricarbonyl trihalide (29)

with m-phenylenediamine (30) in the presence of the monofunctional substance aniline (34) and within a suitable organic solvent, then adding the end-capping compound acryloyl chloride (32) and effecting a reaction within a suitable organic solvent.

[Chemical Formula 12]

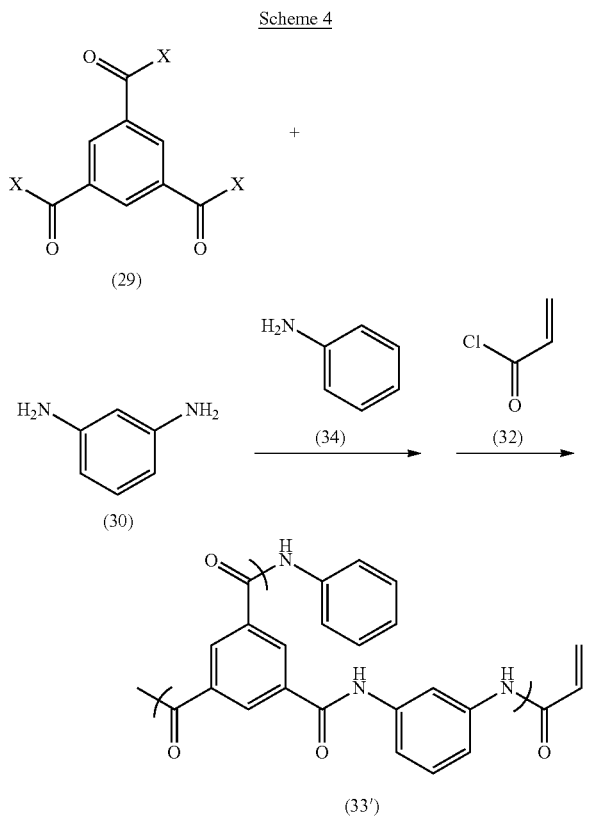

In the above formula, each occurrence of X is independently a halogen atom.

In the preparation method of the invention, the respective starting materials may be charged in any suitable amount so long as the target polymer can be obtained, although the diamine compound such as m-phenylenediamine (30) is charged in an amount of preferably from 0.01 to 10 equivalents, and more preferably from 0.1 to 5 equivalents, per equivalent of the benzenetricarboxylic acid or a derivative thereof, such as a 1,3,5-benzenetricarbonyl trihalide (29).

In cases where a monofunctional substance such as aniline (34) is used, the charging amount thereof is not particularly limited. However, to increase the solubility of the resulting aromatic polyamide, the amount used per equivalent of the benzenetricarboxylic acid or a derivative thereof is preferably from 0.01 to 10 equivalents, and more preferably from 0.1 to 5 equivalents.

In addition, in the reactions of Schemes 1 and 3, no particular limitation is imposed on the amount in which the end-capping compound such as 1-amino-2-propanol (31) is charged. However, to increase the reactivity of the resulting aromatic polyamide with the crosslinking agent, the end-capping compound is charged in an amount of preferably from 0.01 to 20 equivalents, and more preferably from 0.1 to 5 equivalents, per equivalent of the benzenetricarboxylic acid or a derivative thereof.

In the reactions of Schemes 2 and 4, no particular limitation is imposed on the amount in which the end-capping compound such as acryloyl chloride (32) is charged. However, to increase the reactivity of the resulting aromatic polyamide with the crosslinking agent, the end-capping compound is charged in an amount of preferably from 0.01 to 20 equivalents, and more preferably from 0.1 to 5 equivalents.

In the reactions of Schemes 1 and 3, the order in which the various ingredients are added is not particularly limited. All the ingredients may be mixed together at one time, the ingredients may be charged one at a time in a particular order, or some of the ingredients may be mixed together and the resulting mixture may be mixed with the other ingredients. However, to efficiently suppress gelation during the reaction, it is preferable to use a method wherein first a mixture of the diamine compound with the optionally used monofunctional substance is mixed with the benzenetricarboxylic acid (or a derivative thereof), after which the end-capping compound is added.

In the first stage reaction in Schemes 2 and 4, the order in which the various ingredients are added is not particularly limited. All the ingredients may be mixed together at one time, the ingredients may be charged one at a time in a particular order, or some of the ingredients may be mixed together and the resulting mixture may be mixed with the other ingredients. However, in cases where a monofunctional substance is used, to efficiently suppress gelation during the reaction, it is preferable to use a method wherein a mixture of the diamine compound with the monofunctional substance is mixed together with the benzenetricarboxylic acid (or a derivative thereof).

In above Schemes 1 to 4, the hyperbranched aromatic polyamides has a recurring structure (28) or (28') in which carboxyl groups on the benzenetricarboxylic acid ends are capped, or a recurring structure (33) or (33') in which amino groups on the diamine ends are capped. However, in the method of preparing the aromatic polyamide of the invention, because the reaction is carried out in the presence of a monofunctional substance or end-capping compound which is capable of reacting with a benzenetricarboxylic acid or a derivative thereof, an intermediate having only two reactive sites that has formed by the reaction of these reagents with a benzenetricarboxylic acid or the like also appears to participate in the polymerization reaction.

Therefore, even in the aromatic polyamides obtained from the reactions in above Schemes 1 to 4, in addition to the hyperbranched recurring structures (28), (28'), (33) and (33') above, the linear recurring structure (35) below resulting from polymerization of an intermediate obtained by the reaction of aniline or the like is also thought to exist. However, in this specification, for the sake of convenience, hyperbranched recurring structures such as the recurring structures (28), (28'), (33) and (33') are mentioned as the primary structure.

[Chemical Formula 13]

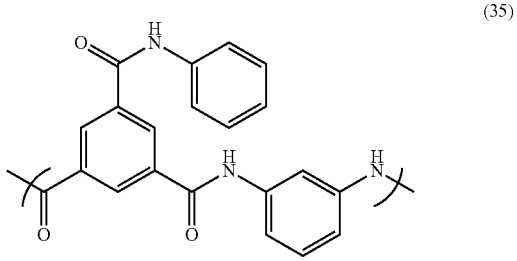

Various solvents that are commonly used in this type of reaction may be used as the organic solvent. Illustrative examples include tetrahydrofuran, dioxane, N,N-dimethylformamide, dimethylsulfoxide, N-methyl-2-pyrrolidone, tetramethylurea, hexamethylphosphoramide, N,N-dimethylacetamide, N-methyl-2-piperidone, N,N-dimethylethyleneurea, and amide solvents such as N,N,N',N'-tetramethylmalonamide, N-methylcaprolactam, N-acetylpyrrolidine, N,N-diethylacetamide, N-ethyl-2-pyrrolidone, N,N-dimethylpropionamide, N,N-dimethylisobutyramide, N-methylformamide and N,N'-dimethylpropyleneurea; as well as mixed solvents thereof.

Of the above, N,N-dimethylformamide, dimethylsulfoxide, N-methyl-2-pyrrolidone, N,N-dimethylacetamide, and mixed solvents thereof are preferred. N,N-Dimethylacetamide and N-methyl-2-pyrrolidone are especially preferred.

In the above polymerization reactions, the reaction temperature may be suitably set in a range of from the melting point to the boiling point of the solvent used, with a range of from about −50 to about 150° C. being preferred, a range of from −30 to 100° C. being more preferred, and a range of from −30 to 50° C. being even more preferred.

Various types of commonly used bases may be used in the above reaction.

Illustrative examples of such bases include potassium carbonate, potassium hydroxide, sodium carbonate, sodium hydroxide, sodium bicarbonate, sodium ethoxide, sodium acetate, lithium carbonate, lithium hydroxide, lithium oxide, potassium acetate, magnesium oxide, calcium oxide, barium hydroxide, trilithium phosphate, trisodium phosphate, tripotassium phosphate, cesium fluoride, aluminum oxide, trimethylamine, triethylamine, diisopropylamine, diisopropylethylamine, N-methylpiperidine, 2,2,6,6-tetramethyl-N-methylpiperidine, pyridine, 4-dimethylaminopyridine and N-methylmorpholine.

The amount of base added per equivalent of the benzenetricarboxylic acid or a derivative thereof is preferably from 1 to 100 equivalents, and more preferably from 1 to 10 equivalents. These bases may be used as aqueous solutions.

Following reaction completion, the product can be easily purified by a technique such as re-precipitation.

The benzenetricarboxylic acid (or derivative) used in the reactions in above Schemes 1 and 2 is a 1,3,5-substitution product, but is not limited to this. For example, it is also possible to use a 1,2,4-substitution product.

The halogen atoms in the benzenetricarbonyl trihalide are preferably chlorine atoms or bromine atoms.

The monofunctional substance in Schemes 3 and 4 is not particularly limited, provided it is a substance which is capable of reacting with a carboxyl group or derivative group thereof on the benzenetricarboxylic acid or benzenetricarboxylic acid derivative that is used.

Such substances are exemplified by substances having on the molecule an amino group, a hydroxyl group, a thiol (mercapto) group, an isocyanate group or an isothiocyanate group. In this invention, a monofunctional substance having an amino group or a hydroxyl group is preferred.

Illustrative examples of monofunctional substances having an amino group include aliphatic monoamines such as methylamine, ethylamine, n-propylamine, i-propylamine and n-butylamine; aromatic monoamines such as aniline, o-, m- and p-toluidine, o-, m- and p-anisidine, and 1- and 2-naphthylamine; araliphatic monoamines such as benzylamine; and alicyclic monoamines such as cyclohexylamine.

Illustrative examples of monofunctional substances having a hydroxyl group include aliphatic monoalcohols such as methanol, ethanol, n-propanol, i-propanol, n-butanol and i-butanol; aromatic monoalcohols such as phenol, o-, m- and p-cresol, and 1- and 2-naphthol; and araliphatic monoalcohols such as benzyl alcohol.

Illustrative examples of monofunctional substances having a thiol group include aliphatic monothiols such as methanethiol, ethanethiol, 1-propanethiol, 2-propanethiol, 1-butanethiol and 2-butanethiol; aromatic monothiols such as thiophenol; and araliphatic monothiols such as benzenemethanethiol.

Illustrative examples of monofunctional substances having an isocyanate group include aliphatic monoisocyanates such as butyl isocyanate and hexyl isocyanate; aromatic monoisocyanates such as phenyl isocyanate; araliphatic monoisocyanates such as benzyl isocyanate; and alicyclic monoisocyanates such as cyclohexyl isocyanate.

Illustrative examples of monofunctional substances having an isothiocyanate group include aliphatic monoisothiocyanates such as butyl isothiocyanate and dodecyl isothiocyanate; aromatic monoisothiocyanates such as phenyl isothiocyanate; araliphatic monoisothiocyanates such as benzyl isothiocyanate; and alicyclic monoisothiocyanates such as cyclohexyl isothiocyanate.

In addition, the end-capping compound having a functional group capable of reacting with benzenetricarboxylic acid or a derivative thereof and having also a crosslinkable group is not particularly limited, provided it is a compound which has at least one functional group capable of reacting with a carboxyl group or a derivative group thereof on the benzenetricarboxylic acid or benzenetricarboxylic acid derivative that is used and also has a crosslinkable group.

The functional group capable of reacting with benzenetricarboxylic acid or a derivative thereof is exemplified by, as mentioned above, an amino group, a hydroxyl group, a thiol (mercapto) group, an isocyanate group and an isothiocyanate group. Here too, an amino group or a hydroxyl group is preferred.

The crosslinkable group is selected according to the type of crosslinking agent to be used, and is generally exemplified by an amino group, a hydroxyl group, a thiol (mercapto) group, an isocyanate group, an isothiocyanate group, or a carbon-carbon unsaturated bond-containing group such as a vinyl group or a (meth)acryloxy group.

The end-capping compound used in the reactions of Schemes 1 and 3 is preferably a compound having an amino group and a hydroxyl group, such as 1-amino-2-propanol; a compound having an amino group and a phenolic hydroxyl group, such as 2-aminophenol, 3-aminophenol and 4-aminophenol; a compound having an amino group and a carbon-carbon double bond, such as aminostyrene; or a compound having a hydroxyl group and a (meth)acryloxy group, such as 2-hydroxyethyl (meth)acrylate, 2-hydroxypropyl (meth)acrylate, 2-hydroxybutyl (meth)acrylate, 2-hydroxyethyl acrylate, 2-hydroxypropyl acrylate, 2-hydroxy-3-phenyloxypropyl (meth)acrylate, 4-hydroxybutyl acrylate, neopentyl glycol mono(meth)acrylate, 4-hydroxycyclohexyl (meth)acrylate, 1,6-hexanediol mono(meth)acrylate, pentaerythritol penta(meth)acrylate and dipentaerythritol penta(meth)acrylate.

The end-capping compound may be used singly or two or more may be used in combination.

The end-capping compound having a functional group capable of reacting with an end from a diamine compound and having also a crosslinkable group is not particularly limited, provided it is a compound having at least one functional group capable of reacting with an amino group from a diamine compound and also having a crosslinkable group.

The functional group capable of reacting with an amino group is exemplified by carboxyl groups and derivative groups of carboxyl groups, such as acid anhydride group and acid halide groups; and also by isocyanate groups and isothiocyanate groups. Of these, carboxyl groups and derivative groups thereof are preferred, with carboxylic acid halide groups being most preferred.

The crosslinkable group is selected according to the type of crosslinking agent to be used, and is generally exemplified by amino groups, hydroxyl groups, thiol (mercapto) groups, isocyanate groups, isothiocyanate groups, and carbon-carbon unsaturated bond-containing groups such as vinyl groups and (meth)acryloxy groups.

The end-capping compounds used in the reactions of Schemes 2 and 4 are exemplified by acryloyl chloride, methacryloyl chloride, crotonoyl chloride, tigloyl chloride, acrylic acid, methacrylic acid, crotonic acid, 3-methylcrotonic acid, and the products available under the trade names Karenz AOI, MOI and BEI (all available from Showa Denko KK). Here too, the end-capping compound may be used singly or two or more may be used in combination.

When preparing the aromatic polyamide of the invention, to increase the linear components within the resulting polyamide and thereby confer flexibility, an aromatic dicarboxylic acid or a derivative thereof, such as benzenedicarbonyl dihalide, may additionally be included.

Illustrative examples of aromatic dicarboxylic acids and derivatives thereof include 1,4-benzenedicarbonyl dihalide (terephthaloyl halide), 1,3-benzenedicarbonyl dihalide (isophthaloyl halide) and 1,2-benzenedicarbonyl dihalide (phthaloyl halide). The halide here is preferably a chloride or a bromide.

The aromatic dicarboxylic acids and derivatives thereof are included in an amount which, although not particularly limited so long as a hyperbranched structure can be formed, is preferably from 0.01 to 0.5 equivalent, and more preferably from 0.1 to 0.4 equivalent, per equivalent of the total amount of benzenetricarboxylic acid and derivatives thereof.

Because the above-described aromatic polyamide of the invention has an excellent solubility in organic solvents, it can be dissolved in various solvents and advantageously used as a film-forming composition (also referred to as a "polymer varnish").

The solvent used to dissolve the aromatic polyamide may be the same as the solvent used during polymerization or may be different.

Illustrative examples of such solvents include toluene, p-xylene, o-xylene, styrene, ethylene glycol dimethyl ether, propylene glycol monomethyl ether, ethylene glycol monomethyl ether, propylene glycol, propylene glycol monoethyl ether, ethylene glycol monoethyl ether, ethylene glycol monoisopropyl ether, ethylene glycol methyl ether acetate, propylene glycol monomethyl ether acetate, ethylene glycol ethyl ether acetate, diethylene glycol dimethyl ether, propylene glycol monobutyl ether, ethylene glycol monobutyl ether, diethylene glycol diethyl ether, dipropylene glycol monomethyl ether, diethylene glycol monomethyl ether, dipropylene glycol monoethyl ether, diethylene glycol monoethyl ether, triethylene glycol dimethyl ether, diethylene glycol monoethyl ether acetate, diethylene glycol, 1-octanol, ethylene glycol, hexylene glycol, trimethylene glycol, 1-methoxy-2-butanol, cyclohexanol, diacetone alcohol, furfuryl alcohol, tetrahydrofurfuryl alcohol, propylene glycol, benzyl alcohol, 1,3-butanediol, 1,4-butanediol, 2,3-butanediol, γ-butyrolactone, acetone, methyl ethyl ketone, methyl isopropyl ketone, diethyl ketone, methyl isobutyl ketone, methyl n-butyl ketone, cyclohexanone, ethyl acetate, isopropyl acetate, n-propyl acetate, isobutyl acetate, n-butyl acetate, methanol, ethanol, isopropanol, tert-butanol, allyl alcohol, n-propanol, 2-methyl-2-butanol, isobutanol, n-butanol, 2-methyl-1-butanol, 1-pentanol, 2-methyl-1-pentanol, 2-ethylhexanol, 1-octanol, ethylene glycol, hexylene glycol, trimethylene glycol, 1-methoxy-2-butanol, diacetone alcohol, furfuryl alcohol, tetrahydrofurfuryl alcohol, propylene glycol, benzyl alcohol, isopropyl ether, 1,4-dioxane, tetrahydrofuran, N,N-dimethylformamide, N,N-dimethylacetamide, N-methylpyrrolidone, 1,3-dimethyl-2-imidazolidinone, dimethylsulfoxide and N-cyclohexyl-2-pyrrolidinone. These may be used singly or two or more may be used in combination.

Of these, from the standpoint of the solubility and storage stability of the polymer, N,N-dimethylformamide, N,N-dimethylacetamide, N-methylpyrrolidone, 1,3-dimethyl-2-imidazolidinone, dimethylsulfoxide, tetrahydrofuran, cyclohexanone and propylene glycol monomethyl ether are preferred.

The solids concentration within the film-forming composition is not particularly limited, provided it falls within a range that does not affect the storage stability of the composition, and may be suitably set according to the target film thickness. Specifically, from the standpoint of solubility and storage stability, the solids concentration is preferably from 0.1 to 50 wt %, and more preferably from 0.1 to 20 wt %.

In addition to the aromatic polyamide and the solvent, other ingredients, such as leveling agents, surfactants and crosslinking agents, may also be included in this invention, provided that doing so does not detract from the advantageous effects of the invention.

Illustrative examples of surfactants include the following nonionic surfactants: polyoxyethylene alkyl ethers such as polyoxyethylene lauryl ether, polyoxyethylene stearyl ether, polyoxyethylene cetyl ether and polyoxyethylene oleyl ether; polyoxyethylene alkylaryl ethers such as polyoxyethylene octyl phenol ether and polyoxyethylene nonyl phenol ether; polyoxyethylene-polyoxypropylene block copolymers; sorbitan fatty acid esters such as sorbitan monolaurate, sorbitan monopalmitate, sorbitan monostearate, sorbitan monooleate, sorbitan trioleate and sorbitan tristearate; and polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; and additionally include fluorosurfactants such as those available under the trade names Eftop EF301, EF303 and EF352 (from Mitsubishi Materials Electronic Chemicals Co., Ltd. (formerly Jemco Inc.)), Megafac F171, F173, R-08 and R-30 (DIC Corporation), Fluorad FC430 and FC431 (Sumitomo 3M, Ltd.), AsahiGuard AG710 and Surflon S-382, SC101, SC102, SC103, SC104, SC105 and SC106 (Asahi Glass Co., Ltd.); and also the organosiloxane polymers KP341 (Shin-Etsu Chemical Co., Ltd.) and BYK-302, BYK-307, BYK-322, BYK-323, BYK-330, BYK-333, BYK-370, BYK-375 and BYK-378 (BYK-Chemie Japan KK).

These surfactants may be used singly or two or more may be used in combination. The amount of surfactant used per 100 parts by weight of the aromatic polyamide is preferably from 0.0001 to 5 parts by weight, more preferably from 0.001 to 1 part by weight, and even more preferably from 0.01 to 0.5 part by weight.

Crosslinking agents that may be used in the film-forming composition of the invention are not particularly limited, provided they are compounds having a substituent which is capable of reacting with the crosslinkable group on the above-described end-capping compound.

Examples of such compounds include melamine compounds having a crosslink-forming substituent such as a methylol group or a methoxymethyl group, substituted urea compounds, compounds having a crosslink-forming substituent such as an epoxy group or an oxetane group, compounds having a blocked isocyanate group, compounds having an acid anhydride group, compounds having a (meth)acryl group, phenoplast compounds, and oxazoline compounds. From the standpoint of heat resistance and storage stability, compounds having an epoxy group, a blocked isocyanate group, a (meth)acryl group or an oxazoline group are preferred.

These compounds, when used for end group treatment of the polymer, should have at least one crosslink-forming substituent. When used for crosslinking treatment between polymers, they must have at least two crosslink-forming substituents.

The polyfunctional epoxy compounds are not particularly limited, provided they have two or more epoxy groups on the molecule.

Illustrative examples include tris(2,3-epoxypropyl) isocyanurate, 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4'-methylenebis(N,N-diglycidylaniline), 3,4-epoxycyclohexylmethyl-3,4-epoxycyclohexane carboxylate, trimethylolethane triglycidyl ether, bisphenol A diglycidyl ether and pentaerythritol polyglycidyl ether.

Examples of commercial products that may be used include epoxy resins having at least two epoxy groups, such as YH-434 and YH-434L (from Tohto Kasei Co., Ltd.); epoxy resins having a cyclohexene oxide structure, such as Epolead GT-401, GT-403, GT-301 and GT-302, and also Celloxide 2021 and 3000 (all from Daicel Chemical Industries, Ltd.); bisphenol A-type epoxy resins such as Epikote (now "jER") 1001, 1002, 1003, 1004, 1007, 1009, 1010 and 828 (all from Japan Epoxy Resin Co., Ltd.); bisphenol F-type epoxy resins such as Epikote (now "jER") 807 (Japan Epoxy Resin Co., Ltd.); phenol-novolak type epoxy resins such as Epikote (now "jER") 152 and 154 (Japan Epoxy Resin Co., Ltd.), and EPPN 201 and 202 (Nippon Kayaku Co., Ltd.); cresol-novolak type epoxy resins such as EOCN-102, EOCN-103S, EOCN-104S, EOCN-1020, EOCN-1025 and EOCN-1027 (Nippon Kayaku Co., Ltd.), and Epikote (now "jER") 180S75 (Japan Epoxy Resin Co., Ltd.); alicyclic epoxy resins such as Denacol EX-252 (Nagase ChemteX Corporation), CY175, CY177 and CY179 (Ciba-Geigy AG), Araldite CY-182, CY-192 and CY-184 (Ciba-Geigy AG), Epiclon 200 and 400 (DIC Corporation), Epikote (now "jER") 871 and 872 (Japan Epoxy Resin Co., Ltd.), and ED-5661 and ED-5662 (Celanese Coating KK); and aliphatic polyglycidyl ethers such as Denacol EX-611, EX-612, EX-614, EX-622, EX-411, EX-512, EX-522, EX-421, EX-313, EX-314 and EX-321 (Nagase ChemteX Corporation).

The polyfunctional (meth)acrylic compounds are not particularly limited, provided they have two or more (meth)acryl groups on the molecule.

Illustrative examples include ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylolpropane triacrylate, ethoxylated trimethylolpropane trimethacrylate, ethoxylated glycerol triacrylate, ethoxylated glycerol trimethacrylate, ethoxylated pentaerythritol tetraacrylate, ethoxylated pentaerythritol tetramethacrylate, ethoxylated dipentaerythritol hexaacrylate, polyglycerol monoethylene oxide polyacrylate, polyglycerol polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylolpropane triacrylate, trimethylolpropane trimethacrylate, tricyclodecane dimethanol diacrylate, tricyclodecane dimethanol dimethacrylate, 1,6-hexanediol diacrylate and 1,6-hexanediol dimethacrylate.

The polyfunctional (meth)acrylic compound may be acquired as a commercial product, illustrative examples of which include NK Ester A-200, A-400, A-600, A-1000, A-9300 (tris(2-(acryloyloxy)ethyl) isocyanurate), A-9300-1CL, A-TMPT, UA-53H, 1G, 2G, 3G, 4G, 9G, 14G, 23G, ABE-300, A-BPE-4, A-BPE-6, A-BPE-10, A-BPE-20, A-BPE-30, BPE-80N, BPE-100N, BPE-200, BPE-500, BPE-900, BPE-1300N, A-GLY-3E, A-GLY-9E, A-GLY-20E, A-TMPT-3E0, A-TMPT-9E0, ATM-4E and ATM-35E (all from Shin-Nakamura Chemical Co., Ltd.); KAYARAD™ DPEA-12, PEG400DA, THE-330 and RP-1040 (all from Nippon Kayaku Co., Ltd.); M-210 and M-350 (from Toagosei Co., Ltd.); KAYARAD™ DPHA, NPGDA and PET30 (Nippon Kayaku Co., Ltd.); NK Ester A-DPH, A-TMPT, A-DCP, A-HD-N, TMPT, DCP, NPG and HD-N (all from Shin-Nakamura Chemical Co., Ltd.); NK Oligo U-15HA (Shin-Nakamura Chemical Co., Ltd.); and NK Polymer Vanaresin GH-1203 (Shin-Nakamura Chemical Co., Ltd.).

The acid anhydride compounds are not particularly limited, provided they are carboxylic acid anhydrides obtained by the dehydration/condensation of two molecules of carboxylic acid. Illustrative examples include those having one acid anhydride group on the molecule, such as phthalic anhydride, tetrahydrophthalic anhydride, hexahydrophthalic anhydride, methyl tetrahydrophthalic anhydride, methyl hexahydrophthalic anhydride, nadic anhydride, methyl nadic anhydride, maleic anhydride, succinic anhydride, octyl succinic anhydride and dodecenyl succinic anhydride; and those having two acid anhydride groups on the molecule, such 1,2,3,4-cyclobutanetetracarboxylic dianhydride, pyromellitic anhydride, 3,4-dicarboxy-1,2,3,4-tetrahydro-1-naphthalene-succinic dianhydride, bicyclo[3.3.0]octane-2,4,6,8-tetracarboxylic dianhydride, 5-(2,5-dioxotetrahydro-3-furanyl)-3-methyl-3-cyclohexene-1,2-dicarboxylic anhydride, 1,2,3,4-butanetetracarboxylic dianhydride, 3,3',4,4'-benzophenonetetracarboxylic dianhydride, 3,3',4,4'-biphenyltetracarboxylic dianhydride, 2,2-bis(3,4-dicarboxyphenyl)hexafluoropropane dianhydride and 1,3-dimethyl-1,2,3,4-cyclobutanetetracarboxylic dianhydride.

The compounds containing blocked isocyanate groups are not particularly limited, provided they are compounds having on the molecule at least two blocked isocyanate groups, i.e., isocyanate groups (—NCO) that have been blocked with suitable protecting groups, and wherein, upon exposure of the compound to an elevated temperature during heat curing, the protecting groups (blocking moieties) are removed by thermal dissociation and the isocyanate groups that form as a result induce crosslinking reactions with the resin. Such compounds are exemplified by compounds having on the molecule at least two groups of the following formula (which groups may be the same or may each differ).

[Chemical Formula 14]

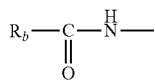

In the formula, $R_b$, is an organic group serving as a blocking moiety.

Such a compound can be obtained by, for example, reacting a suitable blocking agent with a compound having two or more isocyanate groups on the molecule.

Illustrative examples of compounds having two or more isocyanate groups on the molecule include polyisocyanates such as isophorone diisocyanate, 1,6-hexamethylene diisocyanate, methylenebis(4-cyclohexyl isocyanate) and trimethylhexamethylene diisocyanate, and also dimers and trimers thereof, as well as the reaction products of these with diols, triols, diamines or triamines.

Illustrative examples of the blocking agent include alcohols such as methanol, ethanol, isopropanol, n-butanol, 2-ethoxyhexanol, 2-N,N-dimethylaminoethanol, 2-ethoxyethanol and cyclohexanol; phenols such as phenol, o-nitrophenol, p-chlorophenol, and o-, m- and p-cresol; lactams such as ε-caprolactam; oximes such as acetone oxime, methyl ethyl ketone oxime, methyl isobutyl ketone oxime, cyclohexanone oxime, acetophenone oxime and benzophenone oxime; pyrazoles such as pyrazole, 3,5-dimethylpyrazole and 3-methylpyrazole; and thiols such as dodecanethiol and benzenethiol.

The compound containing blocked isocyanate groups may also be acquired as a commercial product, illustrative examples of which include B-830, B-815N, B-842N, B-870N, B-874N, B-882N, B-7005, B7030, B-7075 and B-5010 (all from Mitsui Chemicals Polyurethane, Inc.); Duranate® 17B-60PX, TPA-B80E, MF-B60X, MF-K60X, MF-K60B, E402-B80T and E402-B80B (all from Asahi Kasei Chemicals Corporation); and KarenzMOI-BM™ (Showa Denko KK).

The aminoplast compounds are not particularly limited, provided they are compounds which have at least two methoxymethylene groups on the molecule. Illustrative examples include the following melamine compounds: compounds of the Cymel® series, such as hexamethoxymethylmelamine (Cymel® 303), tetrabutoxymethylglycoluril (Cymel® 1170) and tetramethoxymethylbenzoguanamine (Cymel® 1123) (all from Nihon Cytec Industries, Inc.); and compounds of the Nikalac® series, including the methylated melamine resins Nikalac® MW-30HM, MW-390, MW-100LM and MX-750LM, and the methylated urea resins Nikalac® MX-270, MX-280 and MX-290 (all from Sanwa Chemical Co., Ltd.).

The oxetane compounds are not particularly limited, provided they are compounds which have at least two oxetanyl groups on the molecule. Examples include the oxetane group-bearing compounds OXT-221, OX-SQ-H and OX-SC (from Toagosei Co., Ltd.).

Phenoplast compounds are compounds which have at least two hydroxymethylene groups on the molecule. Upon exposure to an elevated temperature during heat curing, crosslinking reactions proceed by way of dehydration/condensation reactions with the polymer of the invention.

Illustrative examples of phenoplast compounds include 2,6-dihydroxymethyl-4-methylphenol, 2,4-dihydroxymethyl-6-methylphenol, bis(2-hydroxy-3-hydroxymethyl-5-methylphenyl)methane, bis(4-hydroxy-3-hydroxymethyl-5-methylphenyl)methane, 2,2-bis(4-hydroxy-3,5-dihydroxymethylphenyl)propane, bis(3-formyl-4-hydroxyphenyl)methane, bis(4-hydroxy-2,5-dimethylphenyl)formylmethane and α,α-bis(4-hydroxy-2,5-dimethylphenyl)-4-formyltoluene.

The phenoplast compounds may also be acquired as commercial products, illustrative examples of which include 26DMPC, 46DMOC, DM-BIPC-F, DM-BIOC-F, TM-BIP-A, BISA-F, BI25X-DF and BI25X-TPA (all from Asahi Organic Chemicals Industry Co., Ltd.).

The oxazoline compounds are not particularly limited, provided they are compounds which have at least two oxazoline rings on the molecule. Examples include 2-oxazoline, 2-amino-2-oxazoline, 2,2'-bis(2-oxazoline), 1,3-bis(4,5-dihydro-2-oxazolyl)benzene, 1,4-bis(4,5-dihydro-2-oxazolyl)benzene, 1,3,5-tris(4,5-dihydro-2-oxazolyl)benzene, 2,2'-(2,6-pyridinediyl)bis(4-isopropyl-2-oxazoline), 2,2'-(2,6-pyridinediyl)bis(4-phenyl-2-oxazoline), 2-phenyl(2-oxazoline), 4,4-dimethyl-2-oxazoline, 2,2'-isopropylidenebis(4-phenyl-2-oxazoline), 2-ethyl-2-oxazoline, 2,2'-isopropylidenebis(4-t-butyl-2-oxazoline), 2-isopropyl-2-oxazoline, 4-methoxymethyl-2-methyl-5-phenyl-2-oxazoline, 2-methyl-2-oxazoline, 2,4,4-trimethyl-2-oxazoline, and the following Epocros series compounds available from Nippon Shokubai Co., Ltd.: K-1010E, K-2010E, K-1020E, K-2020E, K-1030E, K-2030E, WS-500, WS-700, RPS-1005 and RAS-1005.

The above crosslinking agents may be used singly or two or more may be used in combination. The amount of crosslinking agent used per 100 parts by weight of the aromatic polyamide polymer is preferably from 1 to 100 parts by weight. From the standpoint of solvent resistance, the lower limit is preferably 2 parts by weight, and more preferably 5 parts by weight. From the standpoint of control of the refractive index, the upper limit is preferably 30 parts by weight, and more preferably 20 parts by weight.

In cases where a crosslinking agent having an isocyanate group or a blocked isocyanate group is used, by using a binder resin having two or more active hydrogen-containing groups that are capable of reacting with isocyanate groups on the compound, the film hardness and resistance to moisture absorption can be enhanced. These active hydrogen-containing group are preferably hydroxyl groups or the like that are capable of reacting in a high yield with isocyanate groups.

Therefore, in order to form a crosslinked structure with the blocked isocyanate serving as the curing agent, a polyol compound having two or more hydroxyl groups is preferred; when the polyol compound has only one functional group, a high molecular weight results without the formation of a crosslinked structure.

In cases where a polyol compound is used, although the amount of polyol compound used is not particularly limited, from the standpoint of further increasing the crosslink density of the resulting cured film, from 1 to 200 parts by weight of polyol compound per 100 parts by weight of the aromatic polyamide polymer is preferred. From the standpoint of increasing the hardness of the cured film, the lower limit is preferably 1 part by weight, and more preferably 5 parts by weight, and the upper limit is preferably 100 parts by weight, and more preferably 50 parts by weight.

Illustrative examples of polyol compounds include linear diols such as ethylene glycol, diethylene glycol, 1,3-propanediol, 1,4-butanediol, 1,5-pentanediol, 1,6-hexanediol, 1,7-heptanediol, 1,8-octanediol, 1,9-nonanediol and 1,10-decanediol; branched diols such as propylene glycol, neopentyl glycol, 3-methyl-1,5-pentanediol, 2,2-diethyl-1,3-propanediol, and 1,2-, 1,3- and 2,3-butanediol; diols having a cyclic group, such as cyclopentane-1,2-diol, cyclohexane-1,2-diol, cyclohexane-1,4-diol, 1,4-bis(hydroxymethyl)cyclohexane, and m- and p-xylylene glycol; divalent phenols such as bisphenol A; polyhydric alcohols such as glycerol, polyglycerol, trimethylolpropane, pentaerythritol and dipentaerythritol; sugars and their derivatives, such as sucrose, methyl glucoside and sorbitol; and polymeric polyols such as polyester polyols, polyether polyols, polycarbonate polyols and polycaprolactone polyols.

The polyol compounds may also be acquired as commercial products, illustrative examples of which include Duranol™ T6002, T6001, T5652, T5651, T5650J, T5650E, T4672, T4671, T4692, T4691, G3452 and G3450J (from Asahi Kasei Chemicals Corporation), Acrydic™ A-801-P, A-814, A-817 and A-875-55 (all from DIC Corporation), and Kuraray Polyol™ F-510 and F-1010 (from Kuraray Co., Ltd.).

The above polyol compounds may be used singly, or two or more may be used in admixture.

When a polyfunctional epoxy compound or an oxazoline compound is used as the crosslinking agent, use may be made of a photoacid generator or a photobase generator.

The photoacid generator used may be one that is suitably selected from among known photoacid generators. For example, use may be made of an onium salt derivative such as a diazonium salt, a sulfonium salt or an iodonium salt.

Illustrative examples include aryldiazonium salts such as phenyldiazonium hexafluorophosphate, 4-methoxyphenyldiazonium hexafluoroantimonate and 4-methylphenyldiazonium hexafluorophosphate; diaryliodonium salts such as diphenyliodonium hexafluoroantimonate, di(4-methylphenyl)iodonium hexafluorophosphate and di(4-tert-butylphenyl)iodonium hexafluorophosphate; and triarylsulfonium salts such as triphenylsulfonium hexafluoroantimonate, tris(4-methoxyphenyl)sulfonium hexafluorophosphate, diphenyl-4-thiophenoxyphenylsulfonium hexafluoroantimonate, diphenyl-4-thiophenoxyphenylsulfonium hexafluorophosphate, 4,4'-bis(diphenylsulfonio)phenylsulfide bishexafluoroantimonate, 4,4'-bis(diphenylsulfonio)phenylsulfide bishexafluorophosphate, 4,4'-bis[di(β-hydroxyethoxy)phenylsulfonio]phenylsulfide bishexafluoroantimonate, 4,4'-bis[di(β-hydroxyethoxy)phenylsulfonio]phenylsulfide bishexafluorophosphate, 4-[4'-(benzoyl)phenylthio]phenyl-di(4-fluorophenyl)sulfonium hexafluoroantimonate and 4-[4'-(benzoyl)phenylthio]phenyl-di(4-fluorophenyl)sulfonium hexafluorophosphate.

Commercial products may be used as these onium salts. Illustrative examples include San-Aid SI-60, SI-80, SI-100, SI-60L, SI-80L, SI-100L, SI-L145, SI-L150, SI-L160, SI-L110 and SI-L147 (all available from Sanshin Chemical Industry Co., Ltd.); UVI-6950, UVI-6970, UVI-6974, UVI-6990 and UVI-6992 (all available from Union Carbide); CPI-100P, CPI-100A, CPI-200K and CPI-200S (all available from San-Apro Ltd.); Adeka Optomer SP-150, SP-151, SP-170 and SP-171 (all available from Adeka Corporation); Irgacure 261 (BASF); CI-2481, CI-2624, CI-2639 and CI-2064 (Nippon Soda Co., Ltd.); CD-1010, CD-1011 and CD-1012 (Sartomer Company); DS-100, DS-101, DAM-101, DAM-102, DAM-105, DAM-201, DSM-301, NAI-100, NAI-101, NAI-105, NAI-106, SI-100, SI-101, SI-105, SI-106, PI-105, NDI-105, BENZOIN TOSYLATE, MBZ-101, MBZ-301, PYR-100, PYR-200, DNB-101, NB-101, NB-201, BBI-101, BBI-102, BBI-103 and BBI-109 (all from Midori Kagaku Co., Ltd.); PCI-061T, PCI-062T, PCI-020T and PCI-022T (all from Nippon Kayaku Co., Ltd.); and IBPF and IBCF (Sanwa Chemical Co., Ltd.).

The photobase generator used may be one selected from among known photobase generators. For example, use may be made of Co-amine complex-type, oxime carboxylic acid ester-type, carbamic acid ester-type and quaternary ammonium salt-type photobase generators.

Illustrative examples include 2-nitrobenzylcyclohexyl carbamate, triphenylmethanol, O-carbamoylhydroxylamide, 0-carbamoyloxime, [[(2,6-dinitrobenzyl)oxy]carbonyl]cyclohexylamine, bis[[(2-nitrobenzyl)oxy]carbonyl]hexane-1,6-diamine, 4-(methylthiobenzoyl)-1-methyl-1-morpholinoethane, (4-morpholinobenzoyl)-1-benzyl-1-dimethylaminopropane, N-(2-nitrobenzyloxycarbonyl)pyrrolidine, hexaamminecobalt(III) tris(triphenylmethylborate), 2-benzyl-2-dimethylamino-1-(4-morpholinophenyl)butanone, 2,6-dimethyl-3,5-diacetyl-4-(2'-nitrophenyl)-1,4-dihydropyridine and 2,6-dimethyl-3,5-diacetyl-4-(2',4'-dinitrophenyl)-1,4-dihydropyridine.

A commercial product may be used as the photobase generator. Illustrative examples include TPS-OH, NBC-101 and ANC-101 (all available under these product names from Midori Kagaku Co., Ltd.).

In cases where a photoacid or photobase generator is used, the generator is used in the range of preferably 0.1 to 15 parts by weight, and more preferably 1 to 10 parts by weight, per 100 parts by weight of the polyfunctional epoxy compound.

Also, from 1 to 100 parts by weight of an epoxy resin curing agent may optionally be included per 100 parts by weight of the polyfunctional epoxy compound.

In cases where a polyfunctional (meth)acrylic compound is used, a photoradical initiator may also be used.

A known photoradical initiator may be suitably selected and used for this purpose. Exemplary photoradical initiators include acetophenones, benzophenones, Michler's benzoyl benzoate, amyloxime ester, tetramethylthiuram monosulfide and thioxanthones.

Photocleavable photoradical initiators are especially preferred. Photocleavable photoradical initiators are listed on page 159 of *Saishin UV K•ka Gijutsu* [Recent UV Curing Technology] (publisher, K. Takausu; published by Gijutsu Joho Kyokai KK; 1991).

Examples of commercial photoradical initiators include those available from BASF under the trade names Irgacure 184, 369, 651, 500, 819, 907, 784, 2959, CGI1700, CGI1750, CGI1850 and CG24-61, and the trade names Darocur 1116 and 1173; that available from BASF under the trade name Lucirin TPO; that available from UCB under the trade name Ubecryl P36; and those available under the trade names Esacure KIP150, KIP65LT, KIP100F, KT37, KT55, KT046 and KIP75/B from the Fratelli Lambeth Company.

The photoradical initiator is used in the range of preferably from 0.1 to 15 parts by weight, and more preferably from 1 to 10 parts by weight, per 100 parts by weight of the polyfunctional (meth)acrylic compound.

To increase the cracking resistance of the resulting cured film, the film-forming composition of the invention may additionally include an organic monomer capable of providing a linear polymer of formula (A) below.

[Chemical Formula 15]

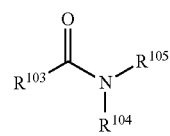

(A)

In formula (A), $R^{103}$ and $R^{105}$ are each independently a hydrogen atom, an alkyl group of 1 to 10 carbons which may have a branched structure, or a polymerizable carbon-carbon double bond-containing group; and $R^{104}$ is a hydrogen atom or an alkyl group of 1 to 10 carbons which may have a branched structure, with the proviso that either of $R^{103}$ and $R^{105}$ is a polymerizable carbon-carbon double bond-containing group but $R^{103}$ and $R^{105}$ are not both at the same time polymerizable carbon-carbon double bond-containing groups.

Of these, $R^{103}$ is preferably a hydrogen atom or a methyl group, and $R^{104}$, to ensure hydrogen bond formability with the aromatic polymide, is preferably a hydrogen atom.

Illustrative examples of the alkyl group of 1 to 10 carbons which may have a branched structure include methyl, ethyl, n-propyl, isopropyl, n-butyl, isobutyl, s-butyl, t-butyl, n-pentyl, 1-methyl-n-butyl, 2-methyl-n-butyl, 3-methyl-n-butyl, 1,1-dimethyl-n-propyl, 1,2-dimethyl-n-propyl, 2,2-dimethyl-n-propyl, 1-ethyl-n-propyl, n-hexyl, 1-methyl-n-pentyl, 2-methyl-n-pentyl, 3-methyl-n-pentyl, 4-methyl-n-pentyl, 1,1-dimethyl-n-butyl, 1,2-dimethyl-n-butyl, 1,3-dimethyl-n-butyl, 2,2-dimethyl-n-butyl, 2,3-dimethyl-n-butyl, 3,3-dimethyl-n-butyl, 1-ethyl-n-butyl, 2-ethyl-n-butyl, 1,1,2-trimethyl-n-propyl, 1,2,2-trimethyl-n-propyl, 1-ethyl-1-methyl-n-propyl, 1-ethyl-2-methyl-n-propyl, n-heptyl, n-octyl, 2-ethylhexyl, n-nonyl and n-decyl.

Of these, alkyl groups of 1 to 5 carbons are preferred.

The polymerizable carbon-carbon double bond-containing group, although not particularly limited, is preferably a carbon-carbon double bond-containing hydrocarbon group (alkenyl group) having from 2 to 10 carbons, and preferably from 2 to 5 carbons. Illustrative examples include ethenyl (vinyl), n-1-propenyl, n-2-propenyl (allyl), 1-methylethenyl, n-1-butenyl, n-2-butenyl, n-3-butenyl, 2-methyl-1-propenyl, 2-methyl-2-propenyl, 1-ethylethenyl, 1-methyl-1-propenyl, 1-methyl-2-propenyl, n-1-pentenyl, n-2-pentenyl, n-3-pentenyl, n-4-pentenyl, 1-n-propylethenyl, 1-methyl-1-butenyl, 1-methyl-2-butenyl, 1-methyl-3-butenyl, 2-ethyl-2-propenyl, 2-methyl-1-butenyl, 2-methyl-2-butenyl, 2-methyl-3-butenyl, 3-methyl-1-butenyl, 3-methyl-2-butenyl, 3-methyl-3-butenyl, 1,1-dimethyl-2-propenyl, 1-i-propylethenyl, 1,2-dimethyl-1-propenyl, 1,2-dimethyl-2-propenyl, n-1-hexenyl, n-2-hexenyl, n-3-hexenyl, n-4-hexenyl, n-5-hexenyl, n-heptenyl, n-octenyl, n-nonenyl and n-decenyl.

Illustrative examples of organic monomers of formula (A) include N-vinylformamide, N-vinylacetamide, N-allylformamide, N-allylacetamide, (meth)acrylamide, N-methyl (meth)acrylamide, N-dimethyl (meth)acrylamide, N-ethyl (meth)acrylamide, N-diisopropyl (meth)acrylamide, N-isopropyl (meth)acrylamide and N-diisopropyl (meth)acrylamide.

No particular limitation is imposed on the amount in which the organic monomer of formula (A) is used. However, to further increase the cracking resistance of the resulting cured film, this is preferably from 1 to 200 parts by weight per 100 parts by weight of the aromatic polyamide polymer. From the standpoint of the cracking resistance of the cured film, the lower limit is preferably 5 parts by weight, and more preferably 10 parts by weight, and the upper limit is preferably 150 parts by weight, and more preferably 100 parts by weight.

The other ingredients mentioned above may be added simultaneously with mixture of the aromatic polyamide and the solvent, or may be added thereafter, without particular limitation.

The desired cured film may be formed by applying the film-forming composition of the invention onto a base material, then optionally heating to evaporate the solvent, and subsequently heating or carrying out light exposure to cure the composition.

Any suitable method may be used for applying the composition, such as spin coating, dipping, flow coating, inkjet printing, spraying, bar coating, gravure coating, slit coating, roll coating, transfer printing, brush coating, blade coating and air knife coating.

Illustrative examples of the base material include silicon, indium-tin oxide (ITO)-coated glass, indium zinc oxide (IZO)-coated glass, polyethylene terephthalate (PET), plastic, glass, quartz and ceramic. Use can also be made of a flexible base material having pliability.

Baking to evaporate off the solvent is carried out at a temperature which, although not particularly limited, may be set to, for example, from 40 to 400° C.

The baking process is not particularly limited. For example, evaporation may be effected using a hot plate or an oven, such evaporation being carried out under a suitable atmosphere, such as in open air, in nitrogen or another inert gas, or in a vacuum.

With regard to the bake temperature and time, conditions which are compatible with the processing steps for the target electronic device should be selected. The bake conditions should be selected in such a way that the physical values of the resulting film conform to the required characteristics of the electronic device.

The conditions in cases where exposure to light is carried out are also not particularly limited. For example, the exposure energy and time should be ones that are suitable for the aromatic polyamide polymer and crosslinking agent that are used.

Because the cured film of the invention that has been thus obtained is able to achieve a high heat resistance, high transparency, high refractive index, high solubility and low volume shrinkage, it can be advantageously used as a component in the fabrication of electronic devices such as liquid-crystal displays, organic EL displays, optical semiconductor devices (LEDs), solid-state image sensors, organic thin-film solar cells, dye-sensitized solar cells and organic thin-film transistors. In particular, because the cured film is resistant to cracking even when produced as a thick-film, such cured films can be advantageously used as the following solid-state image sensor components: embedding films and planarizing films on photodiodes, planarizing films before and after color filters, microlenses, and planarizing films and conformal films on microlenses.

To further increase the planarity of the resulting cured film, a composition similar to the above-described film-forming composition but from which the organic monomer capable of providing a linear polymer has been excluded may be prepared as a planarizing material and, using this material, a planarizing film may be additionally deposited on the cured film.

Specific examples of the aromatic polyamide polymer, crosslinking agent and the like in this planarizing material, as well as the amounts in which these ingredients are included and the film-forming method, are as described above.

EXAMPLES

Working Examples and Comparative Examples are given below to more fully illustrate the invention, although the invention is not limited by these Examples. The instruments and the like used for measurement in the Examples were as follows.

(1) Gel Permeation Chromatograph (GPC)
  Instrument: SCL-10Avp
    (Shimadzu Corporation, modified for GPC)
  Columns: Shodex K-804L+K-805L
  Column temperature: 60° C.
  Solvent: N-Methyl-2-pyrrolidone
    (with 1% LiCl added)
  Detector: UV (254 nm)
  Calibration curve: Polystyrene standard
(2) $^1$H-NMR Spectrum
  Instruments: JNM-ECA700 (JEOL Datum)
  Solvent: DMSO-$d_6$
  Internal standard: Tetramethylsilane
(3) Total Light Transmittance, Haze
  Instrument: NDH 5000
    (Nippon Denshoku Industries Co., Ltd.)
(4) Refractive Index
  Instrument: VASE multiple incident angle spectroscopic ellipsometer
    (JA Woollam Japan)
(5) Ultraviolet/Visible/Near-Infrared Spectrophotometer
  Instrument: UV-3600 (Shimadzu Corporation)
(6) Thermogravimetric/Differential Thermal Analyzer (TG-DTA)
  Instrument: TG-8120 (Rigaku Corporation)
  Temperature ramp-up rate: 10° C./min
  Measurement temperatures: 20° C. to 500° C.
(7) DSC
  Instrument: DSC 204F1 Phoenix (Netzsch)
  Temperature ramp-up rate: 30° C./min
  Measurement temperatures: 25° C. to 300° C.
(8) Pencil Hardness
  Instrument: No. 553-M Film Hardness Tester by Means of Pencils
    (Yasuda Seiki Seisakusho, Ltd.)
  Measurement Method: In accordance with JIS-K5600-5-4, a pencil was pressed against the surface of the thin-film at an angle of 45°, under a load of 750 g and over a distance of 7 mm.
    Measurement was carried out by successively increasing the hardness of the pencil until an indentation formed in the film.
(9) Film Thickness
  Instrument: Dektak 3 Stylus Surface Profiler (Ulvac, Inc.)

[1] Synthesis of Tricarbonylbenzene-Based Hyperbranched Polymers (1)

Example 1

[Chemical Formula 16]

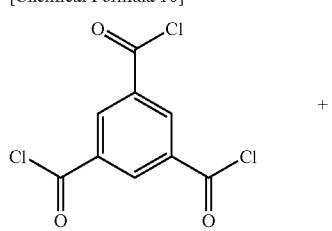

+

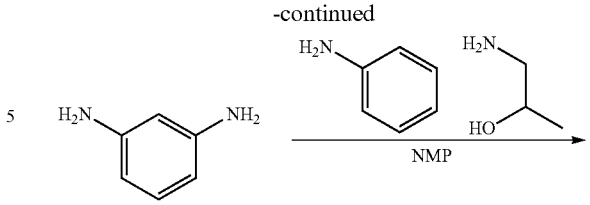

→

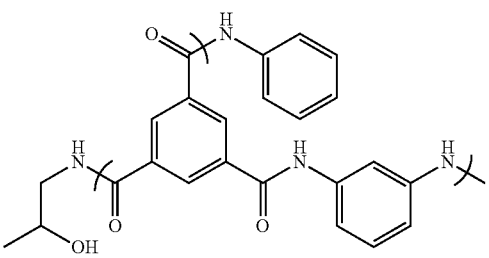

In a nitrogen atmosphere, a 300 mL four-neck flask was charged with 30 g (0.113 mol) of 1,3,5-benzenetricarbonyl trichloride (Tokyo Chemical Industry) and 133.3 g of N-methyl-2-pyrrolidone (abbreviated below as "NMP"; Junsei Chemical Co., Ltd.), following which a solution of 9.16 g (84.8 mmol) of 1,3-phenylenediamine (DuPont K.K.) and 7.89 g (84.8 mmol) of aniline (Junsei Chemical Co., Ltd.) dissolved in 133.3 g of NMP (Junsei Chemical Co., Ltd.) was added dropwise over a period of 30 minutes at an internal temperature of 0 to 5° C. Following the completion of dropwise addition, the flask contents were stirred for 30 minutes at a temperature of 10° C. or below. A solution of 12.73 g (169.5 mmol) of DL-1-amino-2-propanol (Tokyo Chemical Industry) dissolved in 90 g of NMP (Junsei Chemical Co., Ltd.) was added dropwise to this at an internal temperature of from -3 to -1° C. over a period of 30 minutes, following which the temperature was raised to 70° C. and stirring was carried out for 2 hours. The reaction mixture was added to 3,000 g of pure water to effect re-precipitation and the resulting precipitate was collected by filtration, then dried at 150° C. for 3 hours in a vacuum desiccator. The resulting moist product was again dissolved in 180 g of N,N-dimethylacetamide (abbreviated below as "DMAc") and stirred at 55° C. for 1 hour. Next, the DMAc solution was allowed to cool to 30° C., then added to 600 g of pure water heated to 50° C. and re-precipitated, followed by stirring at 50° C. for 1 hour. After allowing the contents to cool to 30° C., filtration was carried out and the filtrate was dried in a vacuum desiccator at 150° C. for 10 hours, giving 35.85 g of the target tricarbonylbenzene-based hyperbranched polymer (abbreviated below as "HPmDAP"). FIG. 1 shows the $^1$H-NMR spectrum obtained for HPmDAP.

The weight-average molecular weight Mw of HPmDAP, as measured by GPC against a polystyrene standard, was 25,164, and the polydispersity Mw/Mn was 3.69.

[Thermal Analysis of Polymer]

The glass transition temperature (Tg) of HPmDAP was measured by differential scanning calorimetry (DSC) and the 5% weight loss temperature ($Td_{5\%}$) was measured by TG-DTA, whereupon a Tg was not detected and the $Td_{5\%}$ was 314.5° C.

Comparative Example 1

[Chemical Formula 17]

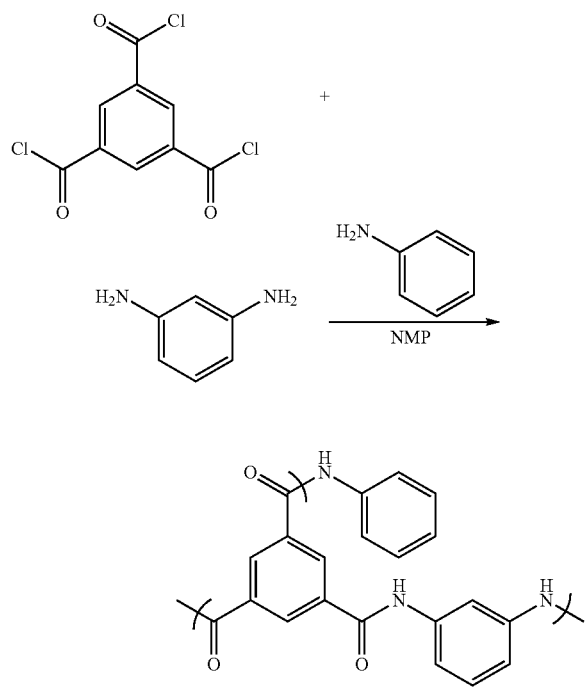

In a nitrogen atmosphere, a 50 mL four-neck flask was charged with 3 g (11.3 mmol) of 1,3,5-benzenetricarbonyl trichloride (Tokyo Chemical Industry) and 13.3 g of NMP (Junsei Chemical Co., Ltd.), following which a solution of 0.92 g (8.48 mmol) of 1,3-phenylenediamine (DuPont K.K.) and 0.79 g (8.48 mmol) of aniline (Junsei Chemical Co., Ltd.) in 13.3 g of NMP (Junsei Chemical Co., Ltd.) was added dropwise over a period of 30 minutes at an internal temperature of 12° C. and polymerization was carried out. Following the completion of dropwise addition, the flask contents were stirred for 30 minutes at room temperature, pure water (3 g) was added dropwise, followed by another 30 minutes of stirring, after which the reaction mixture was added to 450 g of pure water, thereby effecting re-precipitation. The resulting precipitate was collected by filtration, then again dissolved in a mixed solvent of 24 g of THF (Kanto Chemical Co., Ltd.) and 1.8 g of pure water, after which the solution was added to 450 g of pure water, thereby effecting re-precipitation. The resulting precipitate was collected by filtration and dried at 150° C. for 2 hours in a vacuum desiccator, thereby giving 3.3 g of the target tricarbonylbenzene-based hyperbranched polymer (abbreviated below as "TmPDA-An"). FIG. 2 shows the $^1$H-NMR spectrum obtained for TmPDA-An.

The weight-average molecular weight Mw of TmPDA-An, as measured by GPC against a polystyrene standard, was 12,600, and the polydispersity Mw/Mn was 2.38.

[Thermal Analysis of Polymer]

The glass transition temperature (Tg) of TmPDA-An was measured by differential scanning calorimetry (DSC) and the 5% weight loss temperature ($Td_{5\%}$) was measured by TG-DTA, whereupon a Tg was not detected and the $Td_{5\%}$ was 375.3° C.

[2] Heat-Curable Compositions and Production of Films Therefrom (1)

Example 2

(1) Preparation of Heat-Curable Composition

In an air atmosphere, 0.5000 g of the tricarbonylbenzene-based hyperbranched polymer HPmDAP obtained in Example 1 above was added to a 10 mL sample vial, then 1.5000 g of a mixed solvent of DMAc and cyclohexanone (abbreviated below as "CYH") in the weight ratio DMAc/CYH=1/0.6 was added thereto as the solvent, and stirring was carried out with a mixing rotor (110 rpm) at room temperature for 1 hour until dissolution was complete and the solution became uniform. After stirring, a polymer varnish having a total solids content of 25 wt % was obtained as a clear, light yellow-colored solution in which the polymer was completely dissolved. Next, 1.453 g of a mixed solvent of DMAc and CYH (in the weight ratio DMAc/CYH=1/0.6) was added to 4.0000 g of this 25 wt % polymer varnish. To this was added 0.500 g (20.0 parts by weight per 100 parts by weight of the polymer solids) of a solution of the blocked isocyanate-type crosslinking agent MF-K60X (Asahi Kasei Chemicals Corporation) diluted to a solids concentration of 40 wt % with a mixed solvent of DMAc and CYH (in the weight ratio DMAc/CYH=1/0.6). To this was further added 0.050 g (0.05 part by weight per 100 parts by weight of the polymer solids) of a solution of the leveling agent Megafac R-30-N (DIC Corporation) diluted to a solids concentration of 1 wt % with a mixed solvent of DMAc and CYH (in the weight ratio DMAc/CYH=1/0.6). These were stirred until the solutes completely dissolved and the solution became uniform, thereby giving a polymer varnish having a total solids content of 20 wt % (abbreviated below as "HPmDAP-MF").

(2) Production of Film

The resulting polymer varnish was spin-coated onto a quartz substrate with a spin coater at 800 rpm for 30 seconds and subsequently dried for 1 minute in the open air on a hot plate heated to 150° C., then baked for 5 minutes on a hot plate heated to 250° C., thereby giving a tricarbonylbenzene-based hyperbranched polymer thin-film (film thickness, 1,204.0 nm).

<Solvent Resistance Test>

The 1,204.0 nm thickness of the above thin-film was set as the initial film thickness. This thin-film was completely immersed for 1 minute in a mixed solvent of DMAc and CYH (in the weight ratio DMAc/CYH=1/0.6) serving as the varnish solvent. Next, the thin-film was dried in air, then baked 1 minute on a hot plate heated to 150° C., thereby completely evaporating off the remaining solvent, following which the film thickness was measured and compared with the initial film thickness. Letting the initial film thickness be 100%, the residual film ratio for the thin-film was 99.4%, indicating a high solvent resistance.

"Solvent resistance test" refers here to a test to determine whether the film obtained following the main bake is insoluble upon contact with the solvent. Solvent resistance is a property that is critical when the subsequent processes of recoating and patterning a resist or the like on the film are also carried out. In the absence of solvent resistance, the film may end up dissolving in the resist solution during recoating so that the film and the resist mix together and the inherent properties of the film fail to be manifested.

Example 3

(1) Preparation of Heat-Curable Composition

In an air atmosphere, 0.5000 g of the tricarbonylbenzene-based hyperbranched polymer HPmDAP obtained in Example 1 above was added to a 10 mL sample vial, then 1.5000 g of a mixed solvent of DMAc and CYH in the weight ratio DMAc/CYH=1/0.6 was added thereto as the solvent, and stirring was carried out with a mixing rotor (110 rpm) at room temperature for 1 hour until dissolution was complete and the solution became uniform. After stirring, a polymer varnish having a total solids content of 25 wt % was obtained as a clear, light yellow-colored solution in which the polymer was completely dissolved. Next, 1.453 g of a mixed solvent of DMAc and CYH (in the weight ratio DMAc/CYH=1/0.6) was added to 4.0000 g of this 25 wt % polymer varnish. To this was added 0.500 g (20.0 parts by weight per 100 parts by weight of the polymer solids) of a solution of the blocked isocyanate-type crosslinking agent E402-B80B (Asahi Kasei Chemicals Corporation) diluted to a solids concentration of 40 wt % with a mixed solvent of DMAc and CYH (in the weight ratio DMAc/CYH=1/0.6). To this was further added 0.050 g (0.05 part by weight per 100 parts by weight of the polymer solids) of a solution of the leveling agent Megafac R-30-N (DIC Corporation) diluted to a solids concentration of 1 wt % with a mixed solvent of DMAc and CYH (in the weight ratio DMAc/CYH=1/0.6). These were stirred until the solutes completely dissolved and the solution became uniform, thereby giving a polymer varnish having a total solids content of 20 wt % (abbreviated below as "HPmDAP-E").

(2) Production of Film

The resulting polymer varnish was spin-coated onto a quartz substrate with a spin coater at 800 rpm for 30 seconds and subsequently dried for 1 minute in the open air on a hot plate heated to 150° C., then baked for 5 minutes on a hot plate heated to 250° C., thereby giving a tricarbonylbenzene-based hyperbranched polymer thin-film (thickness, 1,226.3 nm).
<Solvent Resistance Test>
The 1,226.3 nm thickness of the above thin-film was set as the initial film thickness. This thin-film was completely immersed for 1 minute in a mixed solvent of DMAc and CYH (in the weight ratio DMAc/CYH=1/0.6) serving as the varnish solvent. Next, the thin-film was dried in air, then baked 1 minute on a hot plate heated to 150° C., thereby completely evaporating off the remaining solvent, following which the film thickness was measured and compared with the initial film thickness. Letting the initial film thickness be 100%, the residual film ratio for the thin-film was 98.6%, indicating a high solvent resistance.

Comparative Example 2

(1) Preparation of Heat-Curable Composition

In an air atmosphere, 1.0000 g of the tricarbonylbenzene-based hyperbranched polymer TmPDA-An obtained in Comparative Example 1 above was added to a 10 mL sample vial, then 4.0000 g of a mixed solvent of DMAc and CYH (in the weight ratio DMAc/CYH=1/0.6) was added thereto as the solvent, and stirring was carried out at room temperature for 1 hour until dissolution was complete and the solution became uniform. After stirring, a polymer varnish having a total solids content of 20 wt % was obtained as a clear, light yellow-colored solution in which the polymer was completely dissolved. Next, 0.7000 g of a mixed solvent of DMAc and CYH (in the weight ratio DMAc/CYH=1/0.6) was added to 3.0000 g of this 20 wt % polymer varnish. To this was added, as a crosslinking agent, 0.300 g (30.0 parts by weight per 100 parts by weight of the polymer solids) of a solution of the aminoplast-type crosslinking agent Cymel 303 (Nihon Cytec Industries, Inc.) diluted to a concentration of 60 wt % with PGME. These were stirred until the solutes completely dissolved and the solution became uniform, thereby giving a polymer varnish having a total solids content of 15 wt % (abbreviated below as "TmPDA-AnCy1").

(2) Production of Film

The polymer varnish obtained above (TmPDA-AnCy1) was spin-coated onto a quartz substrate with a spin coater, first at 200 rpm for 5 seconds then at 1,500 rpm for 30 seconds, and subsequently baked for 5 minutes in the open air on a 200° C. hot plate, thereby giving a thin-film. The resulting thin-film had a thickness of 691.1 nm.
<Solvent Resistance Test>
The 691.1 nm thickness of the above thin-film was set as the initial film thickness. This thin-film was completely immersed for 1 minute in a mixed solvent of DMAc and CYH (in the weight ratio DMAc/CYH=1/0.6). Next, the thin-film was dried in air, then baked 1 minute on a 150° C. hot plate, thereby completely evaporating off the remaining solvent, following which the film thickness was measured and compared with the initial film thickness. Letting the initial film thickness be 100%, the residual film ratio for the resulting thin-film was 100%, from which it was apparent that the thin-film had crosslinked with heating and thus had a high solvent resistance.
<Measurement of Film Refractive Index, Total Light Transmittance and Haze>
The refractive index, total light transmittance and haze of each of the thin-films obtained above were measured. The results are presented in Table 1.

As shown in Table 1, even in the case of compositions to which a heat-curable crosslinking agent was added, the resulting film had a refractive index close to 1.7, which is high, and also had a good transparency.

TABLE 1

| Type of polymer | Total light transmittance (%) | Haze (%) | Refractive index at 589 nm | at 633 nm |
|---|---|---|---|---|
| Example 2 HPmDAP | 89.82 | 0.25 | 1.6761 | 1.6693 |
| Example 3 HPmDAP | 89.45 | 0.29 | 1.6701 | 1.6634 |
| Comparative Example 2 TmPDA-An | 97.75 | 0.07 | 1.7105 | 1.7032 |

<Pencil Hardness Test>
The pencil hardnesses of the thin-films of HPmDAP-MF and HPmDAP-E produced in Examples 2 and 3 above and the thin-film of TmPDA-AnCy1 produced in Comparative Example 2 were measured. The results are presented in Table 2.

As shown in Table 2, it is apparent that by adding a crosslinking agent to a tricarbonylbenzene-based hyperbranched polymer in which crosslinkable groups for increasing the intermolecular crosslink density have been introduced, thin-films having relatively high hardnesses (HB) can be obtained.

TABLE 2

|  | Type of varnish | Pencil hardness |
|---|---|---|
| Example 2 | HPmDAP-MF | HB |
| Example 3 | HPmDAP-E | HB |
| Comparative Example 2 | TmPDA-AnCyl | HB |

<Acid and Alkali Resistance Tests>

The polymer varnishes prepared in Examples 2 and 3 were each spin-coated onto quartz substrates with a spin coater at 800 rpm for 30 seconds and subsequently dried for 1 minute in the open air on a hot plate heated to 150° C., then baked for 5 minutes on a hot plate heated to 250° C., thereby giving, respectively, the tricarbonylbenzene-based hyperbranched polymer thin-films HPmDAP-MF (thickness, 1,221.5 nm) and HPmDAP-E (thickness, 1,239.2 nm).

The 1,221.5 nm and 1,239.2 nm thicknesses of the respective thin-films obtained above and the thickness of the thin-film obtained in Comparative Example 2 were respectively set as the initial film thicknesses. These thin-films were each immersed for 5 minutes in 10% or 5% aqueous HCl and in 10% or 5% aqueous NaOH. The films were then washed with pure water and air-dried, following which they were dried for 1 minute on a hot plate heated to 150° C., after which the film thicknesses were measured and compared with the initial film thickness. The residual film ratios, relative to an initial film thickness of 100%, are shown in Table 3. The results observed under an optical microscope for the thin-films in Examples 2 and 3 are shown in FIGS. 3 to 6.

The residual film ratios of the thin-films obtained from the polymer varnishes prepared in Examples 2 and 3 were high at more than 99%, indicating that the thin-films had high acid and alkali resistances. The thin-films were examined under an optical microscope, as a result of which they were found to be free of defects such as cracks.

On the other hand, the thin-film obtained from the polymer varnish prepared in Comparative Example 2 swelled following immersion in 5% aqueous NaOH, indicating that the alkali resistance was low.

TABLE 3

|  | Type of varnish | HCl (aq.) | NaOH (aq.) |
|---|---|---|---|
| Example 2 | HPmDAP-MF | 101.0% (10%) | 100.1% (10%) |
| Example 3 | HPmDAP-E | 99.7% (10%) | 99.7% (10%) |
| Comparative Example 2 | TmPDA-AnCyl | 100.0% (5%) | swelled (5%) |

[3] Thick-Film Production (1)

Example 4

(1) Preparation of Heat-Curable Composition

In an air atmosphere, 5.0000 g of the tricarbonylbenzene-based hyperbranched polymer HPmDAP obtained in Example 1 above was added to a 10 mL sample vial, then 12.2600 g of a mixed solvent of DMAc and CYH (in the weight ratio DMAc/CYH=1/0.6) was added thereto as the solvent, and stirring was carried out with a mixing rotor (110 rpm) at room temperature for one hour until dissolution was complete and the solution became uniform. After stirring, 2.500 g (20.0 parts by weight per 100 parts by weight of the polymer solids) of a solution of the blocked isocyanate-type crosslinking agent MF-K60X (Asahi Kasei Chemicals Corporation) diluted to a solids concentration of 40 wt % with a mixed solvent of DMAc and CYH (in the weight ratio DMAc/CYH=1/0.6) was added to this polymer varnish. To this was further added 0.2500 g (0.05 part by weight per 100 parts by weight of the polymer solids) of a solution of the leveling agent Megafac R-30-N (DIC Corporation) diluted to a solids concentration of 1 wt % with a mixed solvent of DMAc and CYH (in the weight ratio DMAc/CYH=1/0.6). These were stirred until the solutes completely dissolved and the solution became uniform, thereby giving a polymer varnish having a total solids content of 30 wt % (abbreviated below as "HPm-DAP-MF30").

(2) Production of Film

The resulting polymer varnish HPmDAP-MF30 was cast with a doctor blade onto a quartz substrate to a thickness of 100 μm and subsequently dried for 5 minutes in the open air on a hot plate heated to 150° C., then baked for 10 minutes on a hot plate heated to 200° C., thereby giving a tricarbonylbenzene-based hyperbranched polymer one-coat film.

A second coat was then applied in the same way as described above on the resulting tricarbonylbenzene-based hyperbranched polymer film, thereby giving a two-coat film.

<Measurement of Film Thickness and Transmittance>

The thicknesses of the resulting one-coat film and two-coat film, as measured by the stylus method, and their transmittances to light at 400 nm are presented in Table 4 below. FIG. 7 shows the results of transmittance measurements on the films in the visible wavelength region. As is apparent from Table 4 and FIG. 7, a thick-film with a thickness of close to 30 μm that had a high refractive index and was free of cracking and the like was obtained. In addition, although the film was a thick film, it had a high transmittance of more than 80%, and thus was also endowed with transparency.

TABLE 4

|  |  | Film thickness (μm) | Transparency (%) at 400 nm |
|---|---|---|---|
| Example 4 | one-coat film | 13 | 92.9 |
|  | two-coat film | 27 | 81.5 |

Comparative Example 3

(1) Preparation of Heat-Curable Composition

In an air atmosphere, 6.0000 g of the tricarbonylbenzene-based hyperbranched polymer TmPDA-An obtained in Comparative Example 1 above was added to a 10 mL sample vial, then 14.000 g of a mixed solvent of DMAc and CYH (in the weight ratio DMAc/CYH=1/0.6) was added thereto as the solvent, and stirring was carried out with a mixing rotor (110 rpm) at room temperature for one hour until dissolution was complete and the solution became uniform. After stirring, a polymer varnish having a total solids concentration of 30 wt % was obtained as a clear, light yellow-colored solution in which the polymer was completely dissolved. Next, 0.2500 g of a mixed solvent of DMAc and CYH (in the weight ratio DMAc/CYH=1/0.6) was added to 5.0000 g of this 30 wt % polymer varnish. To this was then added, as a crosslinking agent, 0.7500 g (30.0 parts by weight per 100 parts by weight of the polymer solids) of a solution of the aminoplast-type crosslinking agent Cymel 303 (Nihon Cytec Industries, Inc.) diluted to a concentration of 60 wt % with PGME. These were stirred until the solutes completely dissolved and the solution became uniform, thereby giving a polymer varnish having a total solids content of 32.5 wt % (abbreviated below as "TmPDA-AnCy1-33").

(2) Production of Film

The polymer varnish TmPDA-AnCy1-33 obtained above was cast with a doctor blade onto a quartz substrate to a thickness of 100 μm, and subsequently dried for 5 minutes in the open air on a hot plate heated to 150° C., then baked for 10 minutes on a hot plate heated to 200° C. in an attempt to produce a one-coat film of a tricarbonylbenzene-based hyperbranched polymer. However, cracking arose and the target thick-film could not be obtained.

[4] Synthesis of Tricarbonylbenzene-Based Hyperbranched Polymers (2)

Example 5

[Chemical Formula 18]

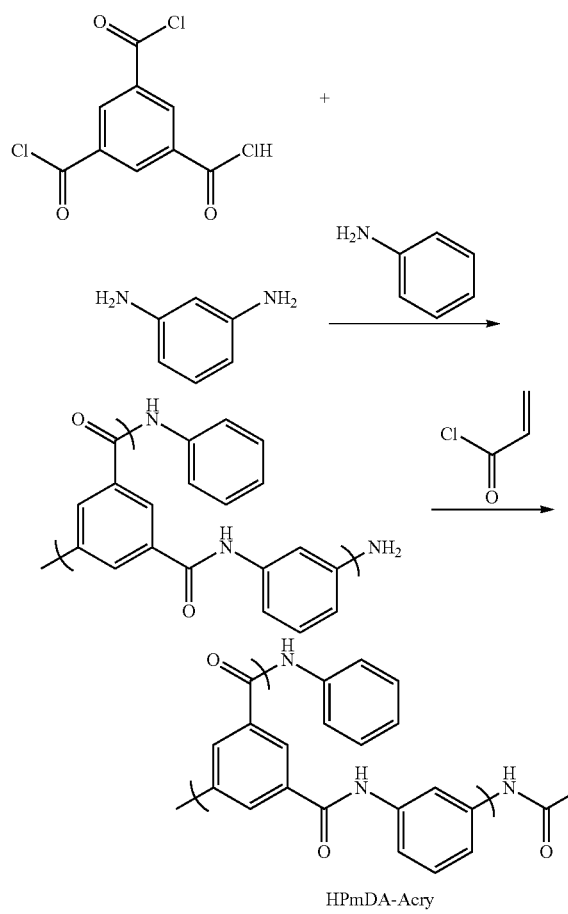

HPmDA-Acry

In a nitrogen atmosphere, a 1,000 mL four-neck flask was charged with 20.37 g (188.3 mmol) of 1,3-phenylenediamine (DuPont K.K.), 28.06 g (301.3 mmol) of aniline (Junsei Chemical Co., Ltd.) and 250.4 g of N-methyl-2-pyrrolidone (Junsei Chemical Co., Ltd.), after which the flask contents were cooled to 5° C. Separately, in a 500 mL four-neck flask and under a nitrogen atmosphere, 40 g (150.7 mmol) of 1,3,5-benzenetricarbonyl trichloride (Wako Pure Chemical Industries, Ltd.) was dissolved in 250.4 g of N-methyl-2-pyrrolidone (Junsei Chemical Co., Ltd.), after which the solution was cooled to −20° C. and subsequently added dropwise to the amine solution at an internal temperature of 5 to 10° C. over a period of 30 minutes, thereby effecting polymerization. Following dropwise addition, the mixture was stirred for 1 hour at 10° C. or below. To this was added dropwise 27.27 g (301.3 mmol) of acryloyl chloride (Tokyo Chemical Industry) at an internal temperature of 5 to 10° C. over a period of 20 minutes, after which the mixture was stirred for 2 hours at 45° C. The reaction mixture was added to 2,000 g of pure water and re-precipitated, and the precipitate thus obtained was collected by filtration then dried at 150° C. for 3 hours in a vacuum desiccator. The resulting moist product was again dissolved in 240 g of DMAc and stirred at 45° C. for 1 hour. The DMAc solution was allowed to cool to 30° C., then added to 2,000 g of pure water and re-precipitated. The resulting precipitate was collected by filtration and dried at 150° C. for 10 hours in a vacuum desiccator, giving 52.7 g of the target tricarbonylbenzene-based hyperbranched polymer (abbreviated below as "HPmDA-Acry"). FIG. 8 shows the measured $^1$H-NMR spectrum for HPmDA-Acry.

The weight-average molecular weight Mw of HPmDA-Acry, as measured by GPC against a polystyrene standard, was 8,275, and the polydispersity Mw/Mn was 2.36.

[Thermal Analysis of Polymer]

The glass transition temperature (Tg) of HPmDA-Acry was measured by differential scanning calorimetry (DSC) and the 5% weight loss temperature ($Td_{5\%}$) was measured by TG-DTA, whereupon the Tg was 137.4° C. and the $Td_{5\%}$ was 374.9° C.

[5] Heat-Curable Compositions and Production of Films Therefrom (2)

Example 6

(1) Preparation of Heat-Curable Composition

In an air atmosphere, 1.0000 g of the tricarbonylbenzene-based hyperbranched polymer HPmDA-Acry obtained in Example 5 above was added to a 10 mL sample vial, then 4.0000 g of a mixed solvent of cyclohexanone and pure water (in the weight ratio CYH/$H_2O$=96/4) was added thereto as the solvent, and stirring was carried out with a mixing rotor (110 rpm) at room temperature for one hour until dissolution was complete and the solution became uniform. After stirring, a polymer varnish having a total solids content of 20 wt % was obtained as a clear, light yellow-colored solution in which the polymer was completely dissolved. Next, 0.564 g of a mixed solvent of cyclohexanone and pure water (in the weight ratio CYH/$H_2O$=96/4) was added to 5.0000 g of this 20 wt % polymer varnish. To this was added 0.333 g (20.0 parts by weight per 100 parts by weight of the polymer solids) of a solution of the polyfunctional acrylate crosslinking agent A-DPH-12E (Shin-Nakamura Chemical Co., Ltd.) diluted to a solids concentration of 60 wt % with a mixed solvent of cyclohexanone and pure water (in the weight ratio CYH/$H_2O$=96/4). To this was further added 0.050 g (0.05 part by weight per 100 parts by weight of the polymer solids) of a solution of the leveling agent Megafac R-30-N (DIC Corporation) diluted to a solids concentration of 1 wt % with a mixed solvent of cyclohexanone and pure water (in the weight ratio CYH/H$_2$O=96/4). Last of all, 1.000 g (5.00 parts by weight per 100 parts by weight of the polymer solids) of a solution of the photoradical initiator Irgacure 127 (BASF) diluted to a solids concentration of 5 wt % with a mixed solvent of cyclohexanone and pure water (in the weight ratio CYH/H$_2$O=96/4) was added. These were stirred until the solutes completely dissolved and the solution became uniform, thereby giving a polymer varnish having a total solids content of 18 wt % (abbreviated below as "HPmDA-Acry-12E").

(2) Production of Film

The polymer varnish prepared above was spin-coated onto a quartz substrate with a spin coater at 1,000 rpm for 30 seconds, dried for 3 minutes in an open-air atmosphere on a 130° C. hot plate, then UV-cured at a cumulative exposure dose of 800 mJ/cm$^2$ in an open-air atmosphere, giving a tricarbonylbenzene-based hyperbranched polymer thin-film.

<Solvent Resistance Test>

The 996.8 nm thickness of the above thin-film was set as the initial film thickness. This thin-film was completely immersed for 1 minute in a mixed solvent of cyclohexanone and pure water (in the weight ratio CYH/H$_2$O=96/4). Next, the thin-film was dried in air and then baked for 1 minute on a 150° C. hot plate, thereby completely evaporating off the remaining solvent, following which the film thickness was measured and compared with the initial film thickness. Letting the initial film thickness be 100%, the residual film ratio for the resulting thin-film was 99.2%, from which it was apparent that the thin-film had a high solvent resistance.

<Measurement of Film Refractive Index, Total Light Transmittance and Haze>

The refractive index, total light transmittance and haze of the thin-film obtained above were measured. The results are presented in Table 5. As shown in Table 5, even in the case of compositions to which a heat-curable crosslinking agent had been added, the resulting film had a refractive index greater than 1.65, which is high.

TABLE 5

| Type of polymer | Total light transmittance (%) | Haze (%) | Refractive index at 589 nm | Refractive index at 633 nm |
|---|---|---|---|---|
| Example 6 HPmDA-Acry | 98.33 | 0.00 | 1.6593 | 1.6531 |

Example 7

(1) Preparation of Heat-Curable Composition

In an air atmosphere, 1.0000 g of the tricarbonylbenzene-based hyperbranched polymer HPmDA-Acry obtained in Example 5 above was added to a 10 mL sample vial, then 4.0000 g of a mixed solvent of cyclohexanone and pure water (in the weight ratio CYH/H$_2$O=96/4) was added thereto as the solvent, and stirring was carried out with a mixing rotor (110 rpm) at room temperature for one hour until dissolution was complete and the solution became uniform. After stirring, a polymer varnish having a total solids content of 20 wt % was obtained as a clear, light yellow-colored solution in which the polymer was completely dissolved. Next, 0.397 g of a mixed solvent of cyclohexanone and pure water (in the weight ratio CYH/H$_2$O=96/4) was added to 5.0000 g of this 20 wt % polymer varnish. To this was added 0.500 g (20.0 parts by weight per 100 parts by weight of the polymer solids) of a solution of the polyfunctional acrylate crosslinking agent KRM-8452 (Daicel Chemical Industries, Ltd.) diluted to a solids concentration of 40 wt % with a mixed solvent of cyclohexanone and pure water (in the weight ratio CYH/H$_2$O=96/4). To this was further added 0.030 g (0.05 part by weight per 100 parts by weight of the polymer solids) of a solution of the leveling agent Megafac R-30-N (DIC Corporation) diluted to a solids concentration of 1 wt % with a mixed solvent of cyclohexanone and pure water (in the weight ratio CYH/H$_2$O=96/4). Last of all, 1.000 g (5.00 parts by weight per 100 parts by weight of the polymer solids) of a solution of the photoradical initiator Irgacure 127 (BASF) diluted to a solids concentration of 5 wt % with a mixed solvent of cyclohexanone and pure water (in the weight ratio CYH/H$_2$O=96/4) was added. These were stirred until the solutes completely dissolved and the solution became uniform, thereby giving a polymer varnish having a total solids content of 18 wt % (abbreviated below as "HPmDA-Acry-KRM").

(2) Production of Film

The polymer varnish prepared above was spin-coated onto a quartz substrate with a spin coater at 1,000 rpm for 30 seconds, dried for 3 minutes in an open-air atmosphere on a 130° C. hot plate, then UV-cured at a cumulative exposure dose of 800 mJ/cm$^2$ in an open-air atmosphere, giving a tricarbonylbenzene-based hyperbranched polymer thin-film.

<Solvent Resistance Test>

The thickness 972.5 nm of the above thin-film was set as the initial film thickness. This thin-film was completely immersed for 1 minute in a mixed solvent of cyclohexanone and pure water (in the weight ratio CYH/H$_2$O=96/4). Next, the thin-film was dried in air, and then baked for 1 minute on a 150° C. hot plate, thereby completely evaporating off the remaining solvent, following which the film thickness was measured and compared with the initial film thickness. Letting the initial film thickness be 100%, the residual film ratio for the resulting thin-film was 99.3%, from which it was apparent that the thin-film had a high solvent resistance.

<Measurement of Film Refractive Index, Total Light Transmittance and Haze>

The refractive index, total light transmittance and haze of the thin-film obtained above were measured. The results are presented in Table 6. As shown in Table 6, even in the case of compositions to which a heat-curable crosslinking agent had been added, the resulting film had a refractive index greater than 1.65, which is high.

TABLE 6

| Type of polymer | Total light transmittance (%) | Haze (%) | Refractive index at 589 nm | Refractive index at 633 nm |
|---|---|---|---|---|
| Example 7 HPmDA-Acry | 98.22 | 0.00 | 1.6626 | 1.6556 |

Example 8

(1) Preparation of Heat-Curable Composition

In an air atmosphere, 3.5000 g of the tricarbonylbenzene-based hyperbranched polymer HPmDA-Acry obtained in Example 5 above was added to a 10 mL sample vial, then 6.5000 g of a mixed solvent of cyclohexanone and pure water (in the weight ratio CYH/H$_2$O=96/4) was added thereto as the solvent, and stirring was carried out with a mixing rotor (110 rpm) at room temperature for one hour until dissolution was complete and the solution became uniform. After stirring, a polymer varnish having a total solids content of 35 wt % was obtained as a clear, light yellow-colored solution in which the polymer was completely dissolved. Next, 3.462 g of a mixed solvent of cyclohexanone and pure water (in the weight ratio CYH/H$_2$O=96/4) was added to 5.0000 g of this 35 wt % polymer varnish. To this was added 1.050 g (30.0 parts by weight per 100 parts by weight of the polymer solids) of a solution of the bifunctional acrylate crosslinking agent Epoxy Ester 80 MFA (Kyoeisha Chemical Co., Ltd.) diluted to a solids concentration of 50 wt % with a mixed solvent of cyclohexanone and pure water (in the weight ratio CYH/H$_2$O=96/4). Next, 0.292 g (10.0 parts by weight per 100 parts by weight of the polymer solids) of a solution of the bifunctional epoxy crosslinking agent Epikote 828 (Japan Epoxy Resin Co., Ltd.) diluted to a solids concentration of 60 wt % with a mixed solvent of cyclohexanone and pure water (in the weight ratio CYH/H$_2$O=96/4) was added. To this was further added 0.0875 g (0.05 part by weight per 100 parts by weight of the polymer solids) of a solution of the leveling agent Megafac R-30-N (DIC Corporation) diluted to a solids concentration of 1 wt % with a mixed solvent of cyclohexanone and pure water (in the weight ratio CYH/H$_2$O=96/4). Last of all, 0.438 g (5.00 parts by weight per 100 parts by weight of the polymer solids) of a solution of the photoradical initiator Irgacure 184 (BASF) diluted to a solids concentration of 20 wt % with a mixed solvent of cyclohexanone and pure water (in the weight ratio CYH/H$_2$O=96/4) and 0.175 g (5.00 parts by weight per 100 parts by weight of the polymer solids) of a solution of the photoacid initiator CPI-200K (San-Apro Ltd.) diluted to a solids concentration of 50 wt % with propylene carbonate were added. These were stirred until the solutes completely dissolved and the solution became uniform, thereby giving a polymer varnish having a total solids content of 25 wt % (abbreviated below as "HPmDA-Acry-EP1").

(2) Production of Film

The polymer varnish prepared above was spin-coated onto a quartz substrate with a spin coater at 1,000 rpm for 30 seconds, dried for 3 minutes in an open-air atmosphere on a 130° C. hot plate, then UV-cured at a cumulative exposure dose of 1,000 mJ/cm$^2$ in an open-air atmosphere, giving a tricarbonylbenzene-based hyperbranched polymer thin-film.
<Solvent Resistance Test>

The 1,310.4 nm thickness of the above thin-film was set as the initial film thickness. This thin-film was completely immersed for 1 minute in a mixed solvent of cyclohexanone and pure water (in the weight ratio CYH/H$_2$O=96/4). Next, the thin-film was dried in air, then baked 1 minute on a 150° C. hot plate, thereby completely evaporating off the remaining solvent, following which the film thickness was measured and compared with the initial film thickness. Letting the initial film thickness be 100%, the residual film ratio for the resulting thin-film was 98.3%, from which it was apparent that the thin-film had a high solvent resistance.
<Measurement of Film Refractive Index, Total Light Transmittance and Haze>

The refractive index, total light transmittance and haze of the thin-film obtained above were measured. The results are presented in Table 7. As shown in Table 7, even in the case of compositions to which a heat-curable crosslinking agent had been added, the resulting film had a refractive index greater than 1.65, which is high.

TABLE 7

| | Type of polymer | Total light transmittance (%) | Haze (%) | Refractive index at 589 nm | at 633 nm |
|---|---|---|---|---|---|
| Example 8 | HPmDA-Acry | 98.15 | 0.00 | 1.6644 | 1.6581 |

Example 9

(1) Preparation of Heat-Curable Composition

In an air atmosphere, 3.5000 g of the tricarbonylbenzene-based hyperbranched polymer HPmDA-Acry obtained in Example 5 above was added to a 10 mL sample vial, then 6.5000 g of a mixed solvent of cyclohexanone and pure water (in the weight ratio CYH/H$_2$O=96/4) was added thereto as the solvent, and stirring was carried out with a mixing rotor (110 rpm) at room temperature for one hour until dissolution was complete and the solution became uniform. After stirring, a polymer varnish having a total solids content of 35 wt % was obtained as a clear, light yellow-colored solution in which the polymer was completely dissolved. Next, 4.162 g of a mixed solvent of cyclohexanone and pure water (in the weight ratio CYH/H$_2$O=96/4) was added to 5.0000 g of this 35 wt % polymer varnish. To this was added 0.700 g (20.0 parts by weight per 100 parts by weight of the polymer solids) of a solution of the bifunctional acrylate crosslinking agent Epoxy Ester 80 MFA (Kyoeisha Chemical Co., Ltd.) diluted to a solids concentration of 50 wt % with a mixed solvent of cyclohexanone and pure water (in the weight ratio CYH/H$_2$O=96/4). Next, 0.292 g (10.0 parts by weight per 100 parts by weight of the polymer solids) of a solution of the bifunctional epoxy crosslinking agent Epikote 828 (Japan Epoxy Resin Co., Ltd.) diluted to a solids concentration of 60 wt % with a mixed solvent of cyclohexanone and pure water (in the weight ratio CYH/H$_2$O=96/4) was added. To this was further added 0.0875 g (0.05 part by weight per 100 parts by weight of the polymer solids) of a solution of the leveling agent Megafac R-30-N (DIC Corporation) diluted to a solids concentration of 1 wt % with a mixed solvent of cyclohexanone and pure water (in the weight ratio CYH/H$_2$O=96/4). Moreover, 0.3500 g (20 parts by weight per 100 parts by weight of the polymer solids) of N-vinylformamide was added as an organic monomer in order to increase cracking resistance. Last of all, 0.438 g (5.00 parts by weight per 100 parts by weight of the polymer solids) of a solution of the photoradical initiator Irgacure 184 (BASF) diluted to a solids concentration of 20 wt % with a mixed solvent of cyclohexanone and pure water (in the weight ratio CYH/H$_2$O=96/4) and 0.175 g (5.00 parts by weight per 100 parts by weight of the polymer solids) of a solution of the photoacid initiator CPI-200K (San-Apro Ltd.) diluted to a solids concentration of 50 wt % with propylene carbonate were added. These were stirred until the solutes completely dissolved and the solution became uniform, thereby giving a polymer varnish having a total solids content of 25 wt % (abbreviated below as "HPmDA-Acry-EP2").

(2) Production of Film

The polymer varnish prepared above was spin-coated onto a quartz substrate with a spin coater at 1,000 rpm for 30 seconds, dried for 3 minutes in an open-air atmosphere on a 130° C. hot plate, then UV-cured at a cumulative exposure dose of 1,000 mJ/cm² in an open-air atmosphere, giving a tricarbonylbenzene-based hyperbranched polymer thin-film.

<Solvent Resistance Test>

The 1,212.3 nm thickness of the above thin-film was set as the initial film thickness. This thin-film was completely immersed for 1 minute in a mixed solvent of cyclohexanone and pure water (in the weight ratio $CYH/H_2O=96/4$). Next, the thin-film was dried in air, then baked 1 minute on a 150° C. hot plate, thereby completely evaporating off the remaining solvent, following which the film thickness was measured and compared with the initial film thickness. Letting the initial film thickness be 100%, the residual film ratio for the resulting thin-film was 96.7%, from which it was apparent that the thin-film had a high solvent resistance.

<Measurement of Film Refractive Index, Total Light Transmittance and Haze>

The refractive index, total light transmittance and haze of the thin-film obtained above were measured. The results are presented in Table 8. As shown in Table 8, even in the case of compositions to which a heat-curable crosslinking agent was added, the resulting film had a refractive index greater than 1.65, which is high.

TABLE 8

| | Type of polymer | Total light transmittance (%) | Haze (%) | Refractive index at 589 nm | at 633 nm |
|---|---|---|---|---|---|
| Example 9 | HPmDA-Acry | 97.61 | 0.01 | 1.6790 | 1.6720 |

<Pencil Hardness Test>

The pencil hardnesses of the thin-films of HPmDA-Acry-12E, HPmDA-Acry-KRM, HPmDA-Acry-EP1 and HPmDA-Acry-EP2 produced in Examples 6 to 9 above were measured. The results are presented in Table 9. As shown in Table 9, it is apparent that by adding a crosslinking agent to a tricarbonylbenzene-type hyperbranched polymer in which crosslinkable groups for increasing the intermolecular crosslink density have been introduced, thin-films having relatively high hardnesses can be obtained.

TABLE 9

| | Type of varnish | Pencil hardness |
|---|---|---|
| Example 6 | HPmDAP-Acry-12E | HB |
| Example 7 | HPmDAP-Acry-KRM | HB |
| Example 8 | HPmDAP-Acry-EP1 | B |
| Example 9 | HPmDAP-Acry-EP2 | B |

<Acid and Alkali Resistance Tests>

The polymer varnishes of HPmDA-Acry-12E, HPmDA-Acry-KRM, HPmDA-Acry-EP1 and HPmDA-Acry-EP2 produced in Examples 6 to 9 above were each spin-coated onto quartz substrates with a spin coater at 1,000 rpm for 30 seconds and subsequently dried for 3 minutes in the open air on a hot plate heated to 130° C., then UV-cured under a cumulative exposure dose of 800 to 1,000 mJ/cm², thereby giving tricarbonylbenzene-based hyperbranched polymer thin-films.

The thicknesses of the thin-films produced above were set as the respective initial film thicknesses; that is, 996.1 nm for HPmDA-Acry-12E, 972.5 nm for HPmDA-Acry-KRM, 1601.2 nm for HPmDA-Acry-EP1, and 1,240.5 nm for HPmDA-Acry-EP2. These thin-films were each immersed for 5 minutes in 10% aqueous HCl and in 10% aqueous NaOH. The films were then rinsed with pure water and air-dried, following which they were dried for 1 minute on a 150° C. hot plate, after which the film thicknesses were measured and compared with the initial film thickness. The residual film ratios, relative to an initial film thickness in each case of 100%, are shown in Table 10. The residual film ratios for these thin-films were all over 98%, indicating that each of the thin-films had high acid and alkali resistances.

TABLE 10

| | Type of varnish | 10% HCl (aq.) | 10% NaOH (aq.) |
|---|---|---|---|
| Example 6 | HPmDAP-Acry-12E | 99.7% | 98.3% |
| Example 7 | HPmDAP-Acry-KRM | 100.0% | 99.8% |
| Example 8 | HPmDAP-Acry-EP1 | 99.4% | 98.7% |
| Example 9 | HPmDAP-Acry-EP2 | 99.5% | 98.3% |

<Heat Resistance Test>

The respective polymer varnishes HPmDA-Acry-12E, HPmDA-Acry-KRM, HPmDA-Acry-EP1 and HPmDA-Acry-EP2 prepared in above Examples 6 to 9 were spin-coated onto quartz substrates with a spin coater at 1,000 rpm for 30 seconds and subsequently dried for 3 minutes in the open air on a 130° C. hot plate, then UV-cured at a cumulative exposure dose of 800 to 1,000 mJ/cm², thereby giving tricarbonylbenzene-based hyperbranched polymer thin-films.

The resulting thick-films were baked in air on a 200° C. hot plate, and the transmittances before and after baking were measured to evaluate the heat resistance. The results are presented in FIGS. 9 to 12.

As shown in FIGS. 9 to 12, even when 2 hours of baking was carried out at an elevated temperature of 200° C., the transmittance in the visible region (400 to 800 nm) remained more than 90%, indicating that the films had a high heat-yellowing resistance.

[6] Production of Thick-Films (2)

Example 10

(1) Preparation of Heat-Curable Composition

In an air atmosphere, 3.5000 g of the tricarbonylbenzene-based hyperbranched polymer HPmDA-Acry obtained in Example 5 above was added to a 10 mL sample vial, then 6.5000 g of a mixed solvent of cyclohexanone and pure water (in the weight ratio $CYH/H_2O=96/4$) was added thereto as the solvent, and stirring was carried out with a mixing rotor (110 rpm) at room temperature for one hour until dissolution was complete and the solution became uniform. After stirring, a polymer varnish having a total solids content of 35 wt % was obtained as a clear, light yellow-colored solution in which the polymer was completely dissolved. Next, 1.711 g of a mixed solvent of cyclohexanone and pure water (in the weight ratio $CYH/H_2O=96/4$) was added to 5.0000 g of this 35 wt % polymer varnish. To this was added 1.050 g (30.0 parts by weight per 100 parts by weight of the polymer solids) of a solution of the bifunctional acrylate crosslinking agent Epoxy Ester 80 MFA (Kyoeisha Chemical Co., Ltd.) diluted to a solids concentration of 50 wt % with a mixed solvent of cyclohexanone and pure water (in the weight ratio $CYH/H_2O=96/4$). Next, 0.292 g (10.0 parts by weight per 100 parts by weight of the polymer solids) of a solution of the bifunctional epoxy crosslinking agent Epikote 828 (Japan Epoxy Resin Co., Ltd.) diluted to a solids concentration of 60 wt % with a mixed solvent of cyclohexanone and pure water (in the weight ratio $CYH/H_2O=96/4$) was added. To this was further added 0.0875 g (0.05 part by weight per 100 parts by weight of the polymer solids) of a solution of the leveling agent Megafac R-30-N (DIC Corporation) diluted to a solids concentration of 1 wt % with a mixed solvent of cyclohexanone and pure water (in the weight ratio CYH/$H_2O$=96/4). Last of all, 0.438 g (5.00 parts by weight per 100 parts by weight of the polymer solids) of a solution of the photoradical initiator Irgacure 184 (BASF) diluted to a solids concentration of 20 wt % with a mixed solvent of cyclohexanone and pure water (in the weight ratio CYH/$H_2O$=96/4) and 0.175 g (5.00 parts by weight per 100 parts by weight of the polymer solids) of a solution of the photoacid initiator CPI-200K (San-Apro Ltd.) diluted to a solids concentration of 50 wt % with propylene carbonate were added. These were stirred until the solutes completely dissolved and the solution became uniform, thereby giving a polymer varnish having a total solids content of 30 wt % (abbreviated below as "HPmDA-Acry-EP1").

(2) Production of Film

The polymer varnish HPmDA-Acry-EP1 prepared above was cast with a doctor blade onto a quartz substrate to a thickness of 100 μm, dried in an open-air atmosphere on a hot plate, first for 2 minutes at 100° C., then for 1 minute at 130° C., and subsequently UV-cured at a cumulative exposure dose of 1,000 mJ/cm$^2$ in an open-air atmosphere, giving a tricarbonylbenzene-based hyperbranched polymer thin-film.

<Measurement of Film Thickness and Transmittance>

The thickness of the film obtained as described above, as measured by the stylus method, and its transmittance to light at 400 nm are presented in Table 11 below. FIG. 13 shows the results of transmittance measurements on the film in the visible wavelength region. As is apparent from Table 11 and FIG. 13, a thick-film with a thickness of more than 10 μm that has a high refractive index and is also free of cracking and the like can be produced. In addition, although the film is a thick film, it has a high transmittance of more than 95% and thus is also endowed with transparency.

TABLE 11

|  | Type of varnish | Film thickness (μm) | Transparency (%) at 400 nm |
| --- | --- | --- | --- |
| Example 10 | HPmDAP-Acry-EP1 | 16 | 95.3 |

Example 11

(1) Preparation of Heat-Curable Composition

In an air atmosphere, 3.5000 g of the tricarbonylbenzene-based hyperbranched polymer HPmDA-Acry obtained in Example 5 above was added to a 10 mL sample vial, then 6.5000 g of a mixed solvent of cyclohexanone and pure water (in the weight ratio CYH/$H_2O$=96/4) was added thereto as the solvent, and stirring was carried out with a mixing rotor (110 rpm) at room temperature for one hour until dissolution was complete and the solution became uniform. After stirring, a polymer varnish having a total solids content of 35 wt % was obtained as a clear, light yellow-colored solution in which the polymer was completely dissolved. Next, 2.295 g of a mixed solvent of cyclohexanone and pure water (in the weight ratio CYH/$H_2O$=96/4) was added to 5.0000 g of this 35 wt % polymer varnish. To this was added 0.700 g (20.0 parts by weight per 100 parts by weight of the polymer solids) of a solution of the bifunctional acrylate crosslinking agent Epoxy Ester 80 MFA (Kyoeisha Chemical Co., Ltd.) diluted to a solids concentration of 50 wt % with a mixed solvent of cyclohexanone and pure water (in the weight ratio CYH/$H_2O$=96/4). Next, 0.292 g (10.0 parts by weight per 100 parts by weight of the polymer solids) of a solution of the bifunctional epoxy crosslinking agent Epikote 828 (Japan Epoxy Resin Co., Ltd.) diluted to a solids concentration of 60 wt % with a mixed solvent of cyclohexanone and pure water (in the weight ratio CYH/$H_2O$=96/4) was added. To this was further added 0.0875 g (0.05 part by weight per 100 parts by weight of the polymer solids) of a solution of the leveling agent Megafac R-30-N (DIC Corporation) diluted to a solids concentration of 1 wt % with a mixed solvent of cyclohexanone and pure water (in the weight ratio CYH/$H_2O$=96/4). Moreover, 0.3500 g (20 parts by weight per 100 parts by weight of the polymer solids) of N-vinylformamide was added as an organic monomer in order to increase cracking resistance. Last of all, 0.438 g (5.00 parts by weight per 100 parts by weight of the polymer solids) of a solution of the photoradical initiator Irgacure 184 (BASF) diluted to a solids concentration of 20 wt % with a mixed solvent of cyclohexanone and pure water (in the weight ratio CYH/$H_2O$=96/4) and 0.175 g (5.00 parts by weight per 100 parts by weight of the polymer solids) of a solution of the photoacid initiator CPI-200K (San-Apro Ltd.) diluted to a solids concentration of 50 wt % with propylene carbonate were added. These were stirred until the solutes completely dissolved and the solution became uniform, thereby giving a polymer varnish having a total solids content of 30 wt % (abbreviated below as "HPmDA-Acry-EP2").

(2) Production of Film

The polymer varnish HPmDA-Acry-EP2 prepared above was cast with a doctor blade onto a quartz substrate to a thickness of 100 μm, dried in an open-air atmosphere on a hot plate, first for 2 minutes at 100° C., then for 1 minute at 130° C., and subsequently UV-cured at a cumulative exposure dose of 1,000 mJ/cm$^2$ in an open-air atmosphere, giving a tricarbonylbenzene-based hyperbranched polymer thin-film.

<Measurement of Film Thickness and Transmittance>

The thickness of the film obtained as described above, as measured by the stylus method, and its transmittance to light at 400 nm are presented in Table 12 below. FIG. 14 shows the results of transmittance measurements on the film in the visible wavelength region. As is apparent from Table 12 and FIG. 14, a thick-film with a thickness of more than 10 μm that has a high refractive index and is also free of cracking and the like can be produced. In addition, although the film is a thick film, it has a high transmittance of at least 95% and thus is also endowed with transparency.

TABLE 12

|  | Type of varnish | Film thickness (μm) | Transparency (%) at 400 nm |
| --- | --- | --- | --- |
| Example 11 | HPmDAP-Acry-EP2 | 11 | 95.0 |

The invention claimed is:
1. An aromatic polyamide which comprises a recurring unit structure of formula (1) below
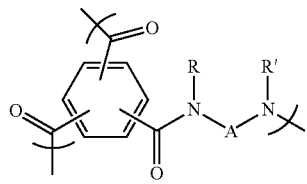
(1)
wherein R and R' are each independently a hydrogen atom, an alkyl group, an alkoxy group, an aryl group or an aralkyl group; and A is at least one moiety selected from the group consisting of moieties of formulas (2) to (26) below
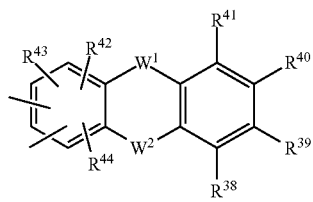
(2), (3)
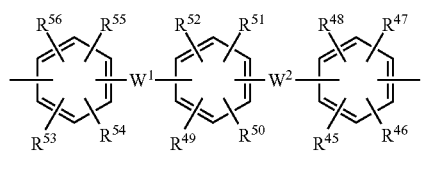
(4), (5)
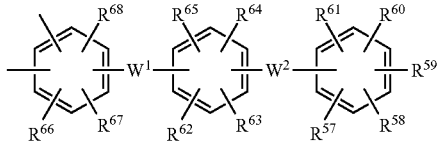
(6), (7)
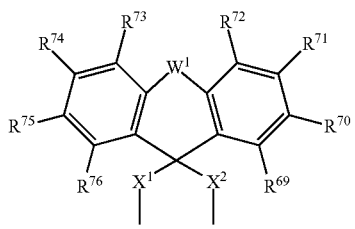
(8)
(9)
(10)
(11)
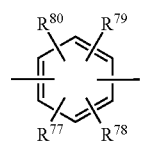
(12)
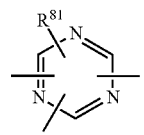
(13)
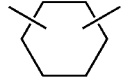
(14)
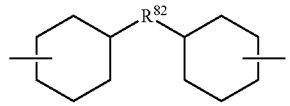
(15)
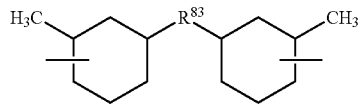
(16)
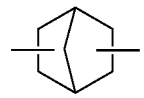
(17)
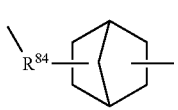
(18)

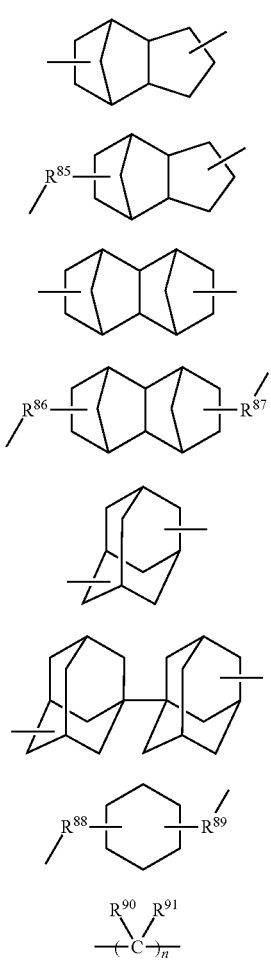

(19)
(20)
(21)
(22)
(23)
(24)
(25)
(26)

in which
- $R^1$ to $R^{81}$ are each independently a hydrogen atom, a halogen atom, a carboxyl group, a sulfone group, an alkyl group of 1 to 10 carbons which may have a branched structure, an alkenyl group of 1 to 10 carbons which may have a branched structure, or an alkoxy group of 1 to 10 carbons which may have a branched structure;
- $R^{82}$ to $R^{89}$ are each independently an alkylene group of 1 to 10 carbons which may have a branched structure;
- $R^{90}$ and $R^{91}$ are each independently a hydrogen atom or an alkyl group of 1 to 10 carbons which may have a branched structure, with the proviso that $R^{90}$ and $R^{91}$ may together form a ring;
- $W^1$ and $W^2$ are each independently a single bond, —$(CR^{92}R^{93})_m$— ($R^{92}$ and $R^{93}$ being each independently a hydrogen atom or an alkyl group of 1 to 10 carbons which may have a branched structure, with the proviso that $R^{92}$ and $R^{93}$ may together form a ring; and m being an integer from 1 to 10), O, S, SO, $SO_2$, $NR^{94}$, C=O, C(=O)O, OC(=O), OC(=O), $CONR^{95}$, $NR^{96}$CO or $NR^{97}CONR^{98}$ ($R^{94}$ to $R^{98}$ being each independently a hydrogen atom or an alkyl group of 1 to 10 carbons which may have a branched structure;
- $X^1$ and $X^2$ are each independently a single bond, an alkylene group of 1 to 10 carbons which may have a branched structure, or a moiety of formula (27) below

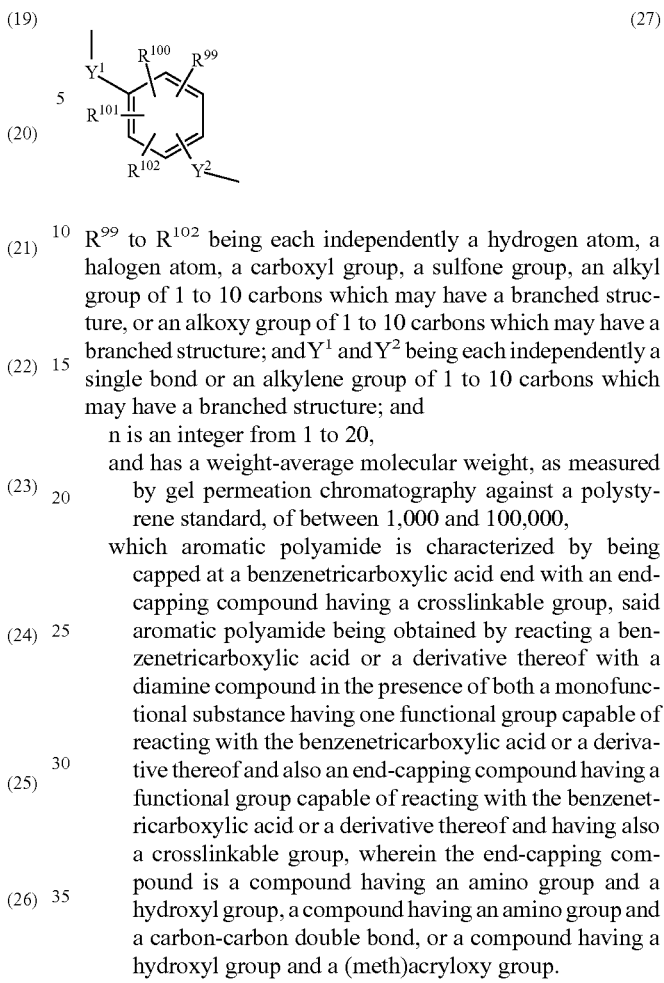

(27)

$R^{99}$ to $R^{102}$ being each independently a hydrogen atom, a halogen atom, a carboxyl group, a sulfone group, an alkyl group of 1 to 10 carbons which may have a branched structure, or an alkoxy group of 1 to 10 carbons which may have a branched structure; and $Y^1$ and $Y^2$ being each independently a single bond or an alkylene group of 1 to 10 carbons which may have a branched structure; and n is an integer from 1 to 20, and has a weight-average molecular weight, as measured by gel permeation chromatography against a polystyrene standard, of between 1,000 and 100,000, which aromatic polyamide is characterized by being capped at a benzenetricarboxylic acid end with an end-capping compound having a crosslinkable group, said aromatic polyamide being obtained by reacting a benzenetricarboxylic acid or a derivative thereof with a diamine compound in the presence of both a monofunctional substance having one functional group capable of reacting with the benzenetricarboxylic acid or a derivative thereof and also an end-capping compound having a functional group capable of reacting with the benzenetricarboxylic acid or a derivative thereof and having also a crosslinkable group, wherein the end-capping compound is a compound having an amino group and a hydroxyl group, a compound having an amino group and a carbon-carbon double bond, or a compound having a hydroxyl group and a (meth)acryloxy group.

2. The aromatic polyamide of claim 1, wherein A is at least one moiety selected from the group consisting of moieties of above formulas (2), (5), (6), (7), (11), (13) and (26).

3. The aromatic polyamide of claim 1, wherein A is at least one moiety selected from the group consisting of moieties of the following formulas

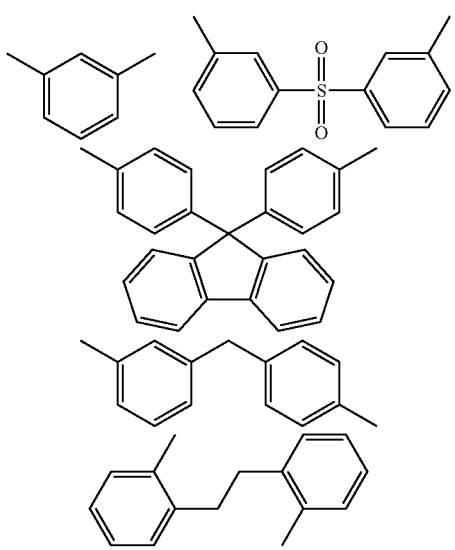

-continued

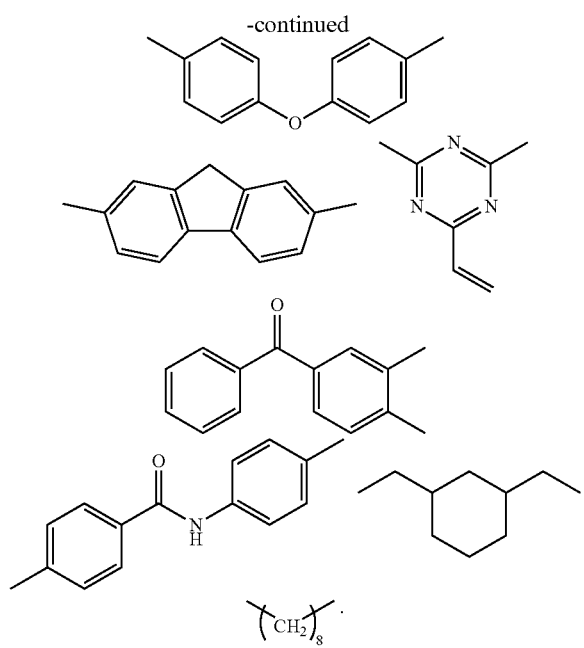

4. The aromatic polyamide of claim 1, wherein the end-capping compound is at least one selected from among
1-amino-2-propanol, 2-aminophenol, 3-aminophenol, 4-aminophenol, aminostyrene, 2-hydroxyethyl (meth)acrylate,
2-hydroxypropyl (meth)acrylate, 2-hydroxybutyl (meth)acrylate,
2-hydroxyethyl acrylate, 2-hydroxypropyl acrylate,
2-hydroxy-3-phenyloxypropyl (meth)acrylate,
4-hydroxybutyl acrylate, neopentyl glycol mono(meth)acrylate,
4-hydroxycyclohexyl (meth)acrylate,
1,6-hexanediol mono(meth)acrylate,
pentaerythritol penta(meth)acrylate and
dipentaerythritol penta(meth)acrylate.

5. A film-forming composition comprising the aromatic polyamide according to claim 1.

6. A film comprising the aromatic polyamide according to claim 1.

7. An electronic device comprising a base material and the film of claim 6 formed on the base material.

8. An optical member comprising a base material and the film of claim 6 formed on the base material.

* * * * *